US009864058B2

(12) United States Patent
Proctor et al.

(10) Patent No.: US 9,864,058 B2
(45) Date of Patent: **\*Jan. 9, 2018**

(54) SYSTEMS AND ASSOCIATED METHODS FOR PRODUCING A 3D SONAR IMAGE

(71) Applicant: NAVICO HOLDING AS, Egersund (NO)

(72) Inventors: Alan Lee Proctor, Owasso, OK (US); David Austin Parks, Tulsa, OK (US); Ronald Joe Horner, Collinsville, OK (US)

(73) Assignee: NAVICO HOLDING AS, Egersund (NO)

( * ) Notice: Subject to any disclaimer, the term of this patent is extended or adjusted under 35 U.S.C. 154(b) by 333 days.

This patent is subject to a terminal disclaimer.

(21) Appl. No.: 14/683,589

(22) Filed: Apr. 10, 2015

(65) Prior Publication Data

US 2016/0259051 A1   Sep. 8, 2016

Related U.S. Application Data

(60) Provisional application No. 62/128,635, filed on Mar. 5, 2015.

(51) Int. Cl.
*G01S 15/00* (2006.01)
*G01S 15/89* (2006.01)
(Continued)

(52) U.S. Cl.
CPC .......... *G01S 15/8902* (2013.01); *G01S 7/521* (2013.01); *G01S 7/524* (2013.01); *G01S 7/526* (2013.01);
(Continued)

(58) Field of Classification Search
CPC . G01S 7/521; G01S 7/54; G01S 7/524; G01S 7/526; G01S 7/56; G01S 15/89; G01S 7/6245

See application file for complete search history.

(56) References Cited

U.S. PATENT DOCUMENTS 4,939,700 A   7/1990   Breton
5,184,330 A   2/1993   Adams et al.
(Continued)

FOREIGN PATENT DOCUMENTS

GB   2294763 A   5/1996

OTHER PUBLICATIONS

Simrad Introduces Forwardscan® [online] [retrieved Nov. 25, 2014]. Retrieved from the Internet: <URL: http://www.simrad-yachting.com/en-US/Pressreleases/2014/Simrad-Introduces-Forwardscan/>. (dated Feb. 25, 2014) 2 pages.
(Continued)

*Primary Examiner* — Hovhannes Baghdasaryan
(74) *Attorney, Agent, or Firm* — Nelson Mullins Riley & Scarborough LLP

(57) ABSTRACT

Provided are a sonar system and transducer assembly for producing a 3D image of an underwater environment. The sonar system may include a housing mountable to a watercraft having at least one transducer array. The transducer array may include a transmit/receive element configured to transmit sonar pulses and a second transducer element. The transmit/receive element and the second transducer element may receive first and second sonar returns convert the first and second returns into first and second sonar return data. A sonar signal processor may then generate a 3D mesh data using the first and second sonar return data and at least a predetermined distance between the transducer elements. An associated method of using the sonar system is also provided.

38 Claims, 35 Drawing Sheets

(51) Int. Cl.
G01S 7/56 (2006.01)
G01S 7/524 (2006.01)
G01S 7/526 (2006.01)
G01S 7/54 (2006.01)
G01S 15/87 (2006.01)
G01S 7/521 (2006.01)
G01S 7/62 (2006.01)

(52) U.S. Cl.
CPC ........ *G01S 7/54* (2013.01); *G01S 7/56* (2013.01); *G01S 7/629* (2013.01); *G01S 7/6245* (2013.01); *G01S 15/003* (2013.01); *G01S 15/876* (2013.01); *G01S 15/89* (2013.01)

(56) References Cited

U.S. PATENT DOCUMENTS

| | | | |
|---|---|---|---|
| 5,200,931 | A | 4/1993 | Kosalos et al. |
| 5,530,680 | A | 6/1996 | Whitehurst |
| 5,537,380 | A | 7/1996 | Sprankle, Jr. et al. |
| 7,606,114 | B2 | 10/2009 | Bachelor et al. |
| 7,755,974 | B2 | 7/2010 | Betts et al. |
| 8,300,499 | B2 | 10/2012 | Coleman et al. |
| 8,305,840 | B2 | 11/2012 | Maguire |
| 8,711,140 | B1 | 4/2014 | Mallet |
| 8,717,847 | B2 | 5/2014 | Blake |
| 8,767,509 | B2* | 7/2014 | Freking .............. G01S 7/536 367/88 |
| 8,953,647 | B1 | 2/2015 | Mead et al. |
| 9,405,028 | B2 | 8/2016 | Bloor |
| 9,495,764 | B1 | 11/2016 | Boardman et al. |
| 2002/0071345 | A1 | 6/2002 | Chiang et al. |
| 2002/0126576 | A1 | 9/2002 | Douma et al. |
| 2002/0188200 | A1 | 12/2002 | Mauchamp et al. |
| 2003/0081503 | A1 | 5/2003 | Barnard et al. |
| 2003/0235112 | A1 | 12/2003 | Zimmerman et al. |
| 2005/0007880 | A1 | 1/2005 | Zimmerman et al. |
| 2005/0036404 | A1 | 2/2005 | Zhu et al. |
| 2005/0093859 | A1 | 5/2005 | Sumanaweera et al. |
| 2005/0099892 | A1 | 5/2005 | Greelish |
| 2005/0101867 | A1 | 5/2005 | Johnson et al. |
| 2005/0270901 | A1 | 12/2005 | Swanson |
| 2006/0186889 | A1 | 8/2006 | Andreis |
| 2007/0025183 | A1 | 2/2007 | Zimmerman et al. |
| 2007/0223306 | A1 | 9/2007 | Toennessen |
| 2007/0223307 | A1 | 9/2007 | Storteig |
| 2008/0080308 | A1 | 4/2008 | Hornby |
| 2008/0239870 | A1 | 10/2008 | Dubuis et al. |
| 2009/0052277 | A1 | 2/2009 | Swanson |
| 2009/0073804 | A1 | 3/2009 | Laws et al. |
| 2011/0013485 | A1 | 1/2011 | Maguire |
| 2011/0038227 | A1 | 2/2011 | Kostov |
| 2011/0128162 | A1 | 6/2011 | Klepsvik |
| 2012/0106299 | A1 | 5/2012 | Rowe et al. |
| 2012/0195471 | A1 | 8/2012 | Newcombe et al. |
| 2013/0148471 | A1 | 6/2013 | Brown et al. |
| 2013/0173163 | A1 | 7/2013 | Zhandov et al. |
| 2013/0208568 | A1 | 8/2013 | Coleman |
| 2014/0010048 | A1 | 1/2014 | Proctor |
| 2014/0200815 | A1 | 7/2014 | Hung et al. |
| 2015/0003689 | A1 | 1/2015 | Sheiman et al. |
| 2015/0066450 | A1 | 3/2015 | Charlesworth et al. |
| 2015/0078123 | A1 | 3/2015 | Batcheller |
| 2015/0097838 | A1 | 4/2015 | Steward et al. |
| 2015/0130797 | A1 | 5/2015 | Chen et al. |
| 2015/0325043 | A1 | 11/2015 | Bromley et al. |
| 2015/0355373 | A1 | 12/2015 | Zhuo et al. |
| 2016/0003008 | A1 | 1/2016 | Uribe et al. |
| 2016/0104359 | A1 | 4/2016 | Abdelrahman |
| 2016/0123499 | A1 | 5/2016 | Lewis |

OTHER PUBLICATIONS

ITC Application Equations for Underwater Sound Transducers, International Transducer Corporation (1995) Rev. 8/00, 3 pages.

U.S. Appl. No. 62/128,641, filed Mar. 5, 2015; In re: Kirmani entitled *Methods and Apparatus for Reconstructing a 3D Sonar Image*.

U.S. Appl. No. 14/618,987, filed Feb. 10, 2015; In re: Parks entitled *A Transducer Array Having a Transceiver*.

U.S. Appl. No. 62/024,416, filed Jul. 14, 2014; In re: Horner et al., entitled *Forward Looking Sonar Display*.

U.S. Appl. No. 62/050,123, filed Sep. 13, 2014; In re: Nickel et al., entitled *Marine Navigation Using Alert Zones*.

European Search Report for European Application No. EP 16158998 dated Jul. 20, 2016.

Giardina; Interferometric Synthetic Aperture Sonar Signal Processing for Autonomous Underwater Vehicles Operating Shallow Water; University of New Orleans Theses and Dissertations; Dec. 15, 2012; Retrieved from the Internet: URL:http://scholarworks.uno.edu/cgi/viewcontent.cgi?article=2587&context=td (retrieved on Jul. 7, 2016).

H.D. Griffiths, et al.; Interferometric Synthetic Aperture Sonar for High-Resolution 3-D Mapping of the Seabed; IEE Proceedings—Radar, Sonar and Navigation; vol. 144, No. 2; Apr. 1997; pp. 96-103.

Roy Edgar Hansen, et al.; Signal Processing for AUV Based Interferometric Synthetic Aperture Sonar; Oceans 2003, MTS/IEEE Proceedings Celebrating the Past, Teaming Toward the Future; San Diego, CA; Sep. 22-26, 2003; Oceans MTS/IEEE Conference Proceedings, Columbia, MD; Marine Techn. Soc., Sep. 22, 2003; pp. 2438-2444.

Citristophe Sintes, et al.; Interferometric Side Scan Sonar: A Tool for High Resolution Sea Floor Exploration; Technical Lessons Learnt from the Erika Incident and Other Oil Spills, Brest, Mar. 13-16, 2002; pp. 1-15.

H. Koyama et al., "Bathymetry by new designed interferometry sonar mounted on AUV", Oceans 2004, MTS/IEEE Techno-Ocean Mar. 14, 2005; pp. 1169-1174.

Gerard Llort-Pujol et al., "A New Approach for Fast and High-Resolution Interfometric Bathymetry", IEEE Oceanic Engineering Society Newsletter, Summer 2006, pp. 12-19.

\* cited by examiner

SYSTEMS AND ASSOCIATED METHODS FOR PRODUCING A 3D SONAR IMAGE

CROSS-REFERENCE TO RELATED APPLICATION

This application claims priority under 35 U.S.C. §119 to U.S. Provisional Application No. 62/128,635, which is entitled "Systems and Associated Methods for Producing a 3D Sonar Image" and was filed Mar. 5, 2015, which is hereby incorporated by reference herein in its entirety.

FIELD OF THE INVENTION

Embodiments of the present invention relate generally to sonar systems and, more particularly, to sonar systems, assemblies, and associated methods for producing a 3D image of an underwater environment.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar sound beam is transmitted into and through the water and is reflected from objects it encounters. The transducer may receive the reflected sound (the "sonar returns") and convert the sound energy into electrical energy. Based on the known speed of sound, it is possible to determine the distance to and/or location of the waterborne or underwater objects. The sonar return signals can also be processed to be displayed in graphical form on a display device, giving the user a "picture" or image of the underwater environment. The signal processor and display may be part of a unit known as a "sonar head" that is connected by a wire to the transducer mounted remotely from the sonar head. Alternatively, the sonar transducer may be an accessory for an integrated marine electronics system offering other features such as GPS, radar, etc.

Traditionally, sonar systems transmit sonar signals into an underwater environment and receive sonar returns that are reflected off objects in the underwater environment (e.g., fish, structure, sea floor bottom, etc.). Applicant has identified a number of deficiencies and problems associated with conventional sonar systems and other associated systems. Through applied effort, ingenuity, and innovation, many of these identified problems have been solved by developing solutions that are included in embodiments of the present invention, many examples of which are described in detail herein.

BRIEF SUMMARY OF THE INVENTION

In general, embodiments of the present invention provided herein include sonar systems, transducer assemblies, methods, and associated methods and systems for producing a 3D sonar image.

In some embodiments, a sonar system may be provided a housing mountable to a watercraft capable of traversing a body of water. The sonar system may include at least one transducer array positioned within the housing and aimed downwardly from the watercraft. The transducer array may comprise a transmit/receive transducer element and a second transducer element. The transmit/receive transducer element may be configured to transmit sonar pulses into the water. The transmit/receive transducer element may be configured to receive first sonar returns from the sonar pulses produced by the transmit/receive transducer element and convert sound energy of the first sonar returns into first sonar return data. The second transducer element may be configured to receive second sonar returns from the sonar pulses produced by the transmit/receive transducer element and convert sound energy of the second sonar returns into second sonar return data. The transmit/receive transducer element may be positioned within the housing at a predetermined distance from the second transducer element. The sonar system may include a sonar signal processor configured to process the first sonar return data and the second sonar return data to generate 3D mesh data based on at least the predetermined distance between the transmit/receive transducer element and the second transducer element.

In some embodiments, the sonar system may include a display configured to display a 3D image of an underwater environment based at least on the 3D mesh data.

In some embodiments, the at least one transducer array may comprise a downscan transducer array such that the transmit/receive transducer element may be configured to transmit sonar pulses in a substantially perpendicular direction to a plane of the surface of the body of water. The transmit/receive transducer element may comprise a linear downscan transducer element configured to transmit the sonar pulses as a fan-shaped beam in at least a direction perpendicular to a direction of travel of the watercraft. In some embodiments, the transmit/receive transducer element may be configured to transmit the fan-shaped beam substantially symmetrically across a centerline of the watercraft. In some embodiments, the linear downscan transducer element may be formed of a plurality of transducer elements electrically connected to act as the linear downscan transducer element.

In some embodiments, at least one of the transmit/receive transducer element and the second transducer element may be further configured to receive downscan sonar returns from the sonar pulses produced by the transmit/receive transducer element and convert sound energy of the downscan sonar returns into downscan sonar return data. The sonar signal processor may be further configured to process the downscan sonar return data to generate downscan image data. The sonar system may include a display configured to display a downscan image of the underwater environment based on the downscan image data.

In some embodiments, the sonar signal processor may be further configured to process the first sonar return data and the second sonar return data to generate a set of 2D sonar data based on the predetermined distance between the transmit/receive transducer element and the second transducer element and generate the 3D mesh data based on the set of 2D sonar data. In some embodiments, the sonar signal processor may be further configured to generate a plurality of sets of 2D sonar data as the watercraft traverses the surface of the body of water and generate the 3D mesh data based on the plurality of sets of 2D sonar data generated as the watercraft traverses the surface of the body of water.

The set of 2D sonar data may define an angle associated with each sonar return within the set of 2D sonar data. The angle associated with each sonar return may be based on the predetermined distance between the transmit/receive transducer element and the second transducer element. The set of 2D sonar data may further define a strength value and a distance value associated with each sonar return within the set of 2D sonar data.

In some embodiments, the sonar signal processor may be further configured to process the first sonar return data and the second sonar return data to generate 2D sonar data by calculating a phase difference between the first sonar return data and the second sonar return data.

The predetermined distance between the transmit/receive transducer element and the second transducer element may define a first predetermined distance. The transducer array may further comprise a third transducer element. The third transducer element may be configured to receive third sonar returns from the sonar pulses produced by the transmit/receive transducer element and convert sound energy of the third sonar returns into third sonar return data. In some embodiments, the third transducer element may be positioned a second predetermined distance from the second transducer element. The sonar signal processor may be further configured to process the first sonar return data, the second sonar return data, and the third sonar return data to generate the 3D mesh data based on at least the first predetermined distance and the second predetermined distance.

In some embodiments, the transducer array may be a downscan transducer array. The sonar system may further comprise at least one sidescan transducer array positioned within the housing and aimed downwardly and outwardly from a side of the watercraft. The sidescan transducer array may comprise a first sidescan transducer element and a second sidescan transducer element. The first sidescan transducer element may be configured to receive fourth sonar returns from the sonar pulses produced by the transmit/receive transducer element and convert sound energy of the fourth sonar returns into fourth sonar return data. The second sidescan transducer element may be configured to receive fifth sonar returns from the sonar pulses produced by the transmit/receive transducer element and convert sound energy of the fifth sonar returns into fifth sonar return data. The first sidescan transducer element may be positioned within the housing at a predetermined distance from the second sidescan transducer element. The sonar signal processor may be further configured to process the fourth sonar return data and the fifth sonar return data to generate the 3D mesh data based on at least the predetermined distance between the first sidescan transducer element and the second sidescan transducer element.

In some embodiments, the predetermined distance may be designed based on a frequency of operation of the transmit/receive transducer element and the second transducer element.

In some embodiments, the transducer array may define an emitting surface that corresponds to an emitting surface of the transmit/receive transducer element and an emitting surface of the second transducer element. The emitting surface may be straight such that the emitting surface of the transmit/receive transducer element and the emitting surface of the second transducer element may be configured to define a same angle with respect to the surface of the body of water.

The transducer array may define an emitting surface that corresponds to an emitting surface of the transmit/receive transducer element and an emitting surface of the second transducer element. The emitting surface may be curved such that the emitting surface of the transmit/receive transducer element and the emitting surface of the second transducer element may be configured to define different angles with respect to the surface of the body of water.

The sonar system may include shielding positioned in the housing and configured to surround at least a portion of the transducer array. The shielding may comprise absorption material that defines at least two mounting slots. A first mounting slot may be configured to surround three sides and two ends of the transmit/receive transducer element. The second mounting slot may be configured to surround three sides and two ends of the second transducer element.

In some embodiments, the transmit/receive transducer element may be configured to emit a fan-shaped sonar beam having a relatively narrow beamwidth in a direction parallel to a fore-to-aft direction of the watercraft and a relatively wide beamwidth in a direction perpendicular to the fore-to-aft direction of the watercraft.

In some embodiments, the transmit/receive transducer element may be formed of a plurality of transducer elements electrically connected to act as the transmit/receive transducer element.

The sonar system may further include a display configured to display the 3D image of the underwater environment based on the 3D mesh data and chart information in a split screen format.

In some other embodiments, transducer assembly or method embodiments may be provided. For example, a transducer assembly may be provided comprising a housing mountable to a watercraft capable of traversing a surface of a body of water. The transducer assembly may include at least one transducer array positioned within the housing and aimed downwardly from the watercraft. The transducer array may comprise a transmit/receive transducer element and a second transducer element. At least one of the transmit/receive transducer element and the second transducer element may be a transmit/receive transducer element configured to transmit sonar pulses into the water. The transmit/receive transducer element may be configured to receive first sonar returns from the sonar pulses produced by the transmit/receive transducer element and convert sound energy of the first sonar returns into first sonar return data. The second transducer element may be configured to receive second sonar returns from the sonar pulses produced by the transmit/receive transducer element and convert sound energy of the second sonar returns into second sonar return data. The transmit/receive transducer element may be positioned within the housing at a predetermined distance from the second transducer element. The first and second transducer elements may be configured to transmit the first sonar return data and the second sonar return data, respectively, to a sonar signal processor to be processed by the sonar signal processor to generate 3D mesh data based on at least the predetermined distance between the first sidescan transducer element and the second sidescan transducer element.

In another embodiment, for example, a method may be provided for imaging an underwater environment. The method may include transmitting sonar pulses into a body of water using a transmit/receive transducer element comprising at least one of a transmit/receive transducer element and a second transducer element of a transducer array positioned within a housing mountable to a watercraft capable of traversing a surface of the body of water. Embodiments of the method may include receiving, via the transmit/receive transducer element of the transducer array, first sonar returns from the sonar pulses produced by the transmit/receive transducer element. The transducer array may be positioned within the housing and aimed downwardly from the watercraft. The transmit/receive transducer element may be configured to convert sound energy of the first sonar returns into first sonar return data. The method may include receiving, via the second transducer element of the transducer array, second sonar returns from the sonar pulses produced by the transmit/receive transducer element. The second transducer element may be configured to convert sound energy of the second sonar returns into second sonar return data. The transmit/receive transducer element may be positioned within the housing at a predetermined distance from the second transducer element. The method may include processing, via a sonar signal processor, the first sonar return data and the second sonar return data to generate 3D mesh data based on at least the predetermined distance between the transmit/receive transducer element and the second transducer element.

BRIEF DESCRIPTION OF THE DRAWINGS

Figure 1:
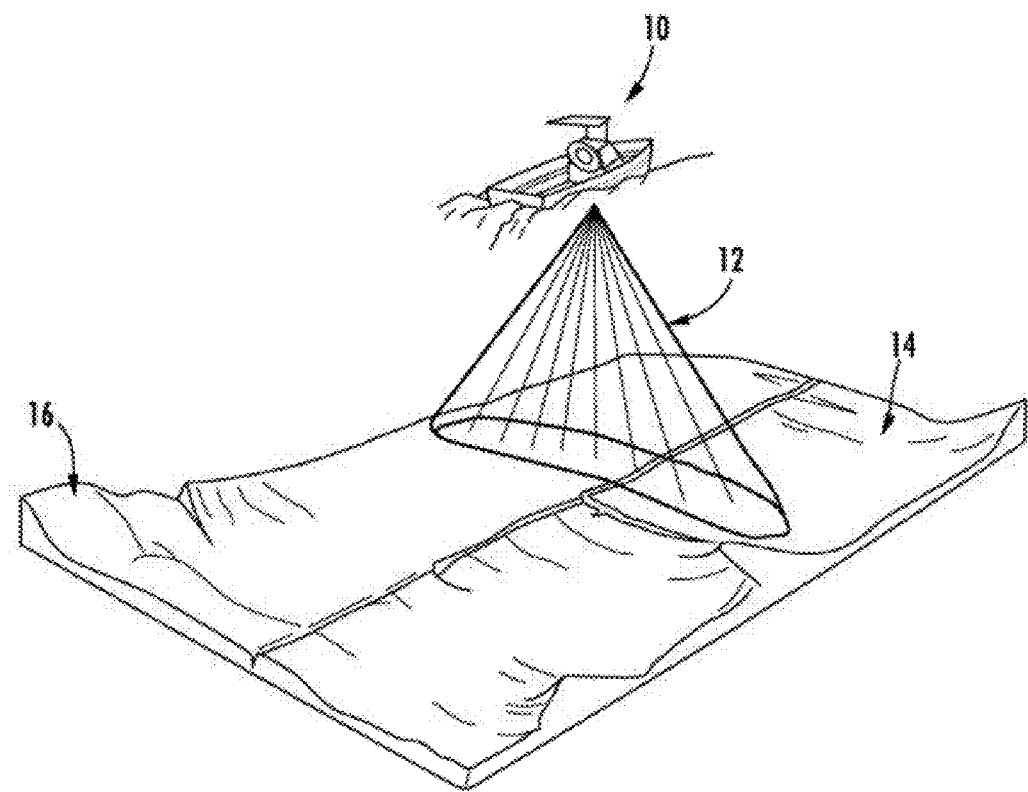
Figure 2:
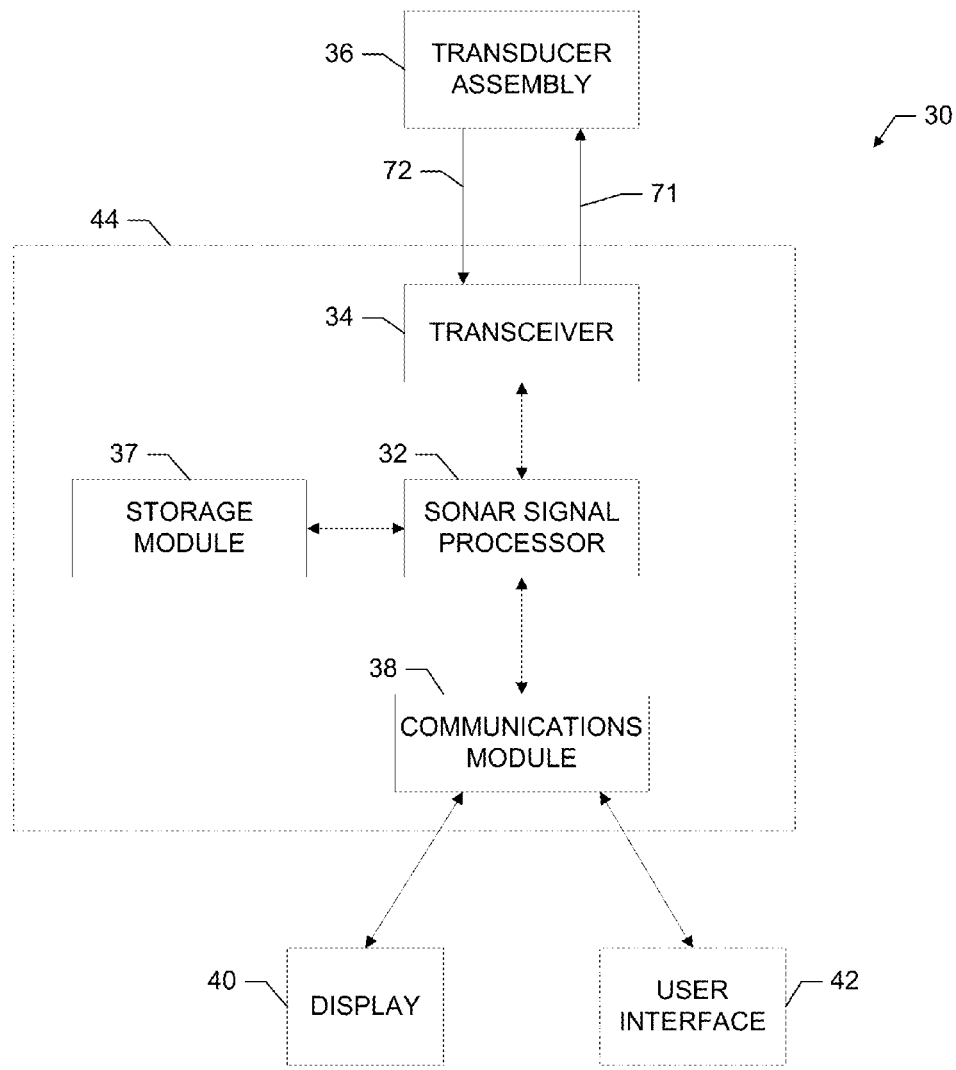
Figure 3A:
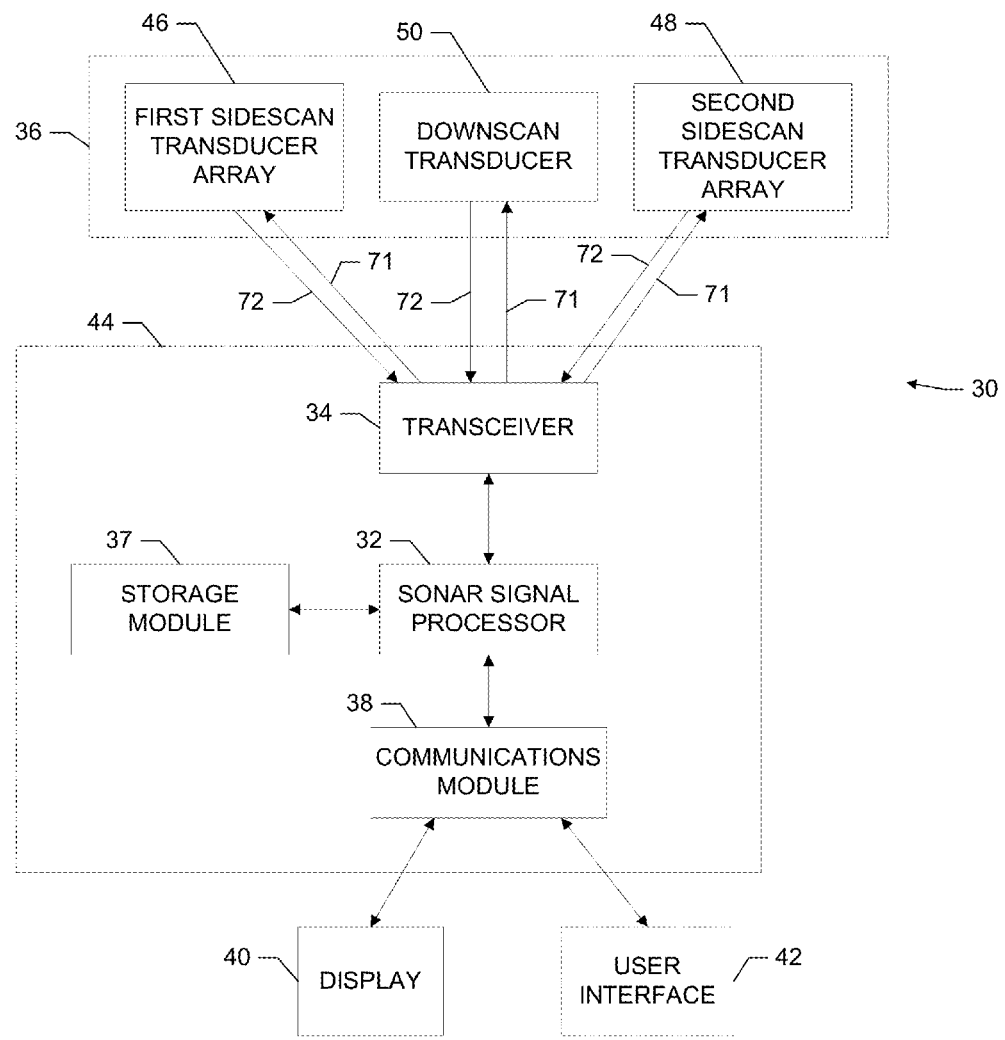
Figure 3B:
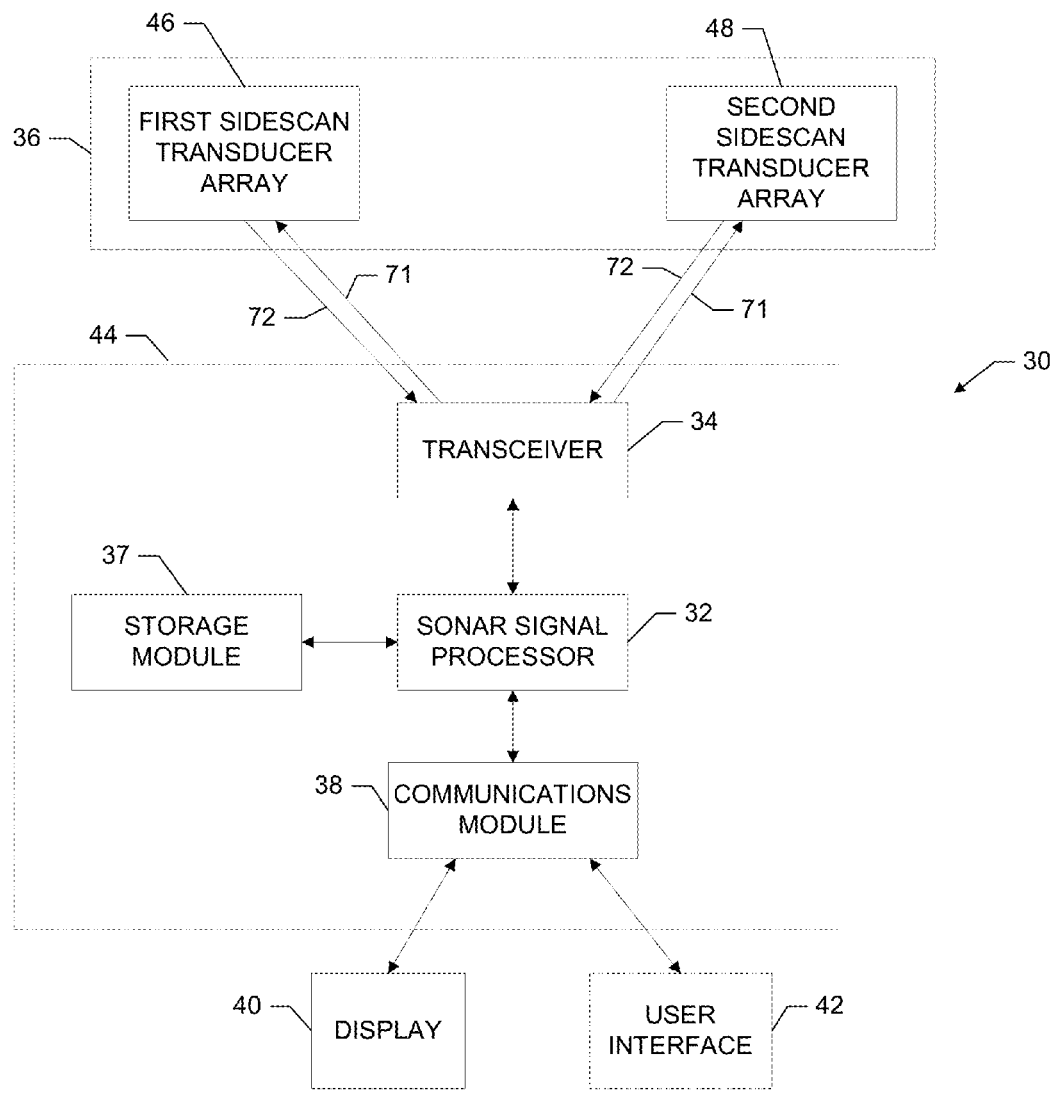
Figure 3C:
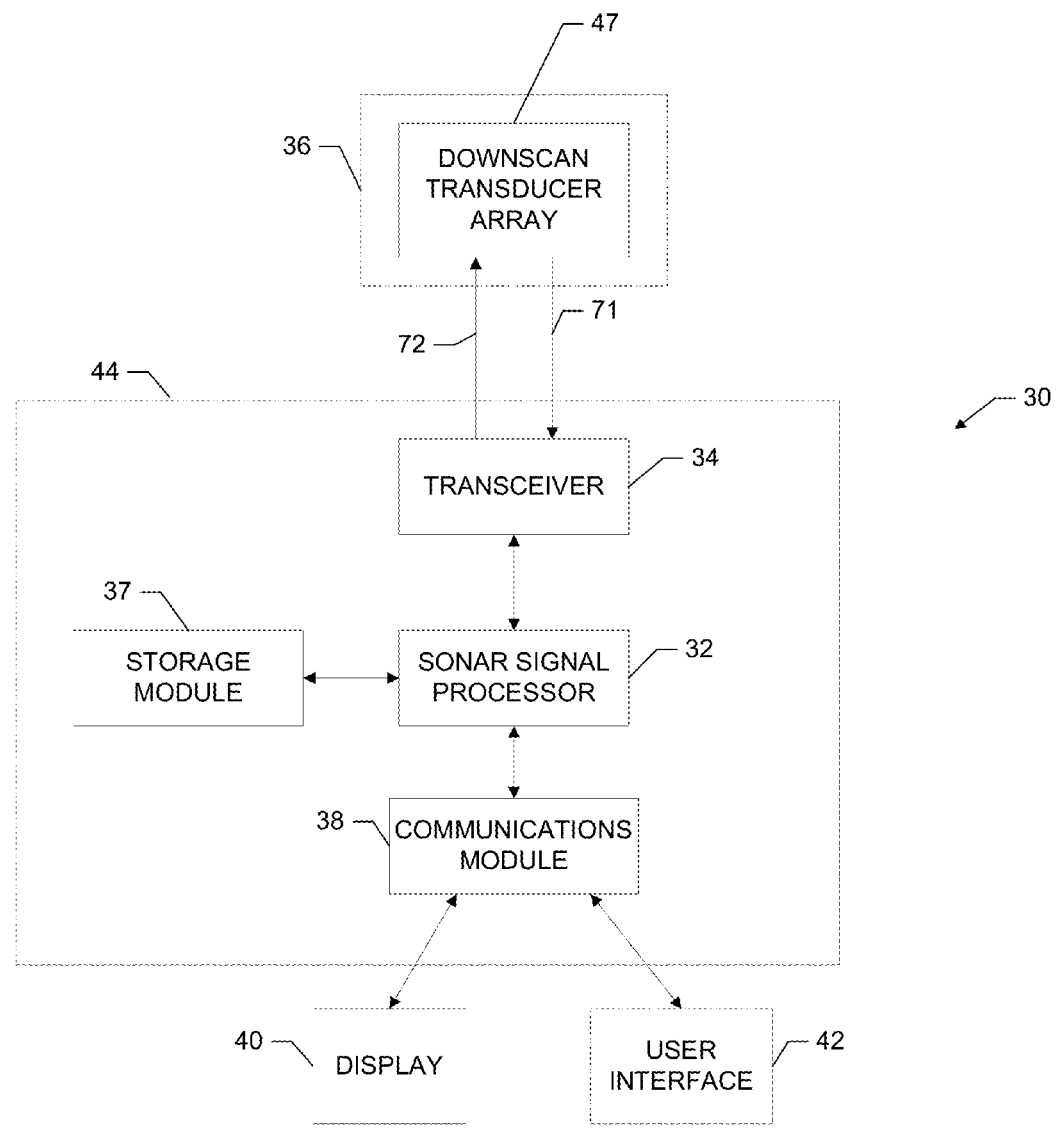
Figure 3D:
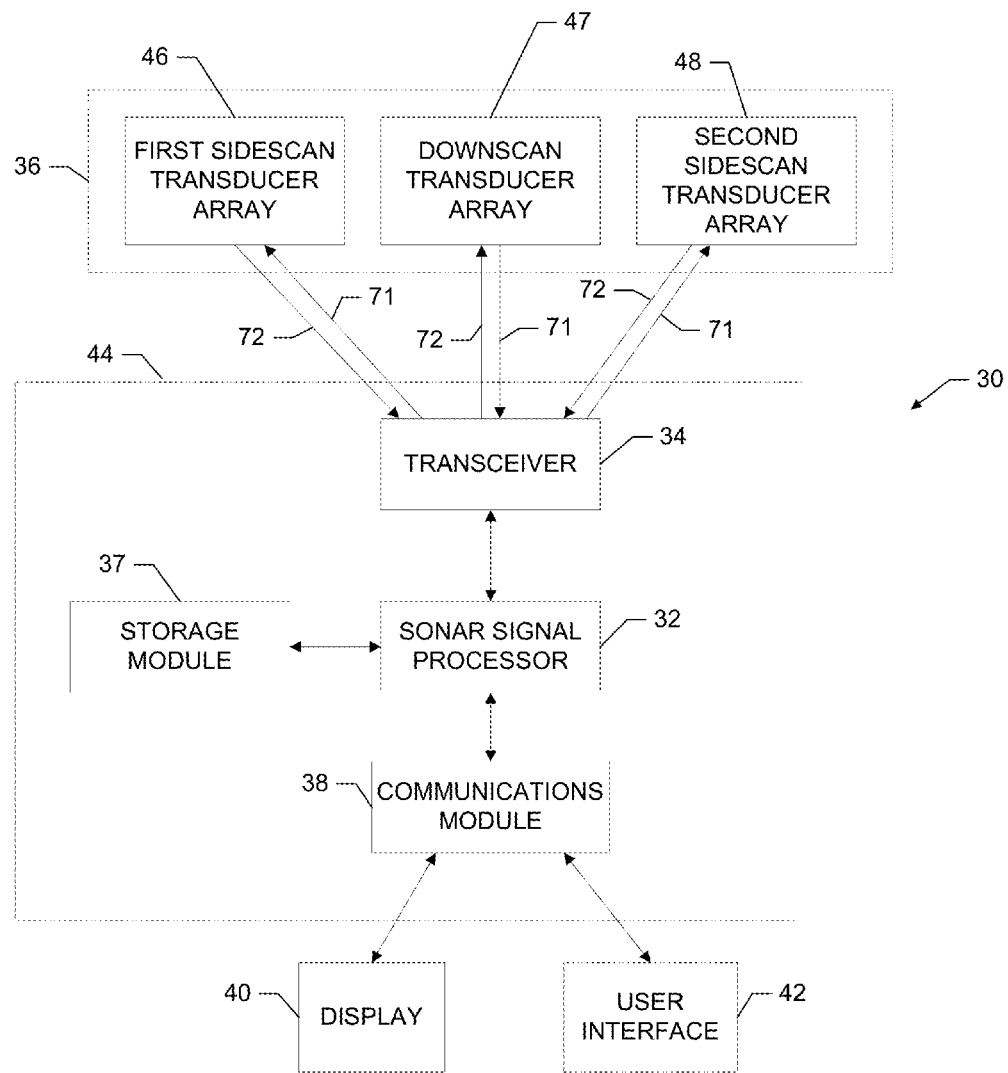
Figure 4:
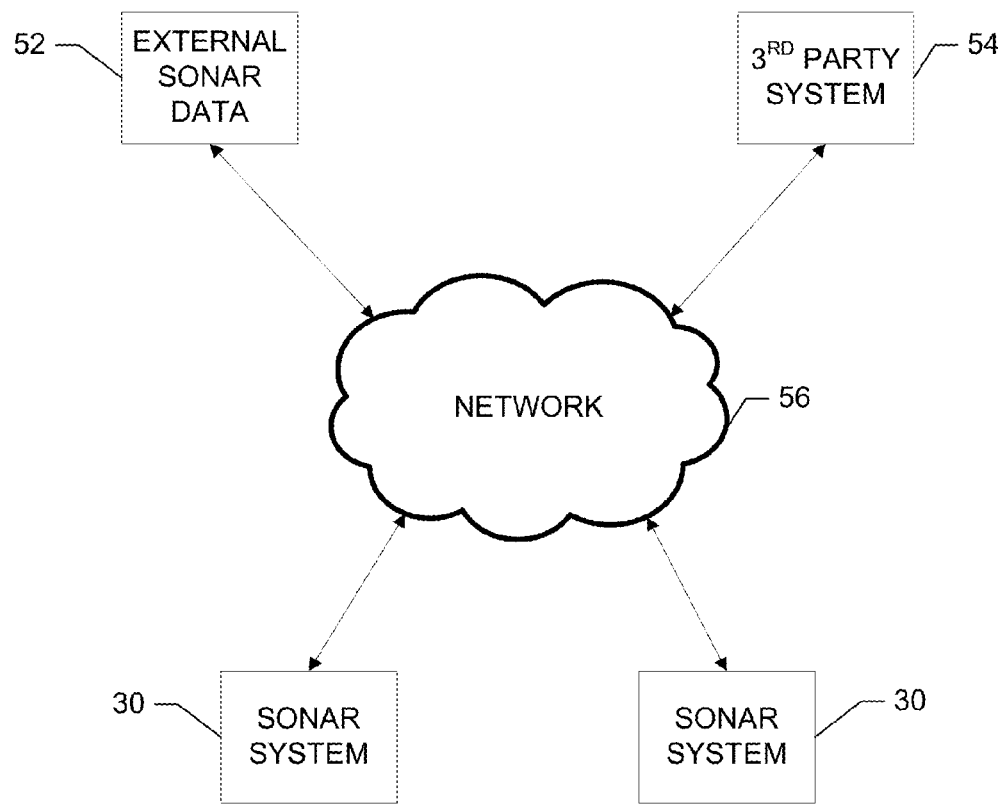
Figure 5A:
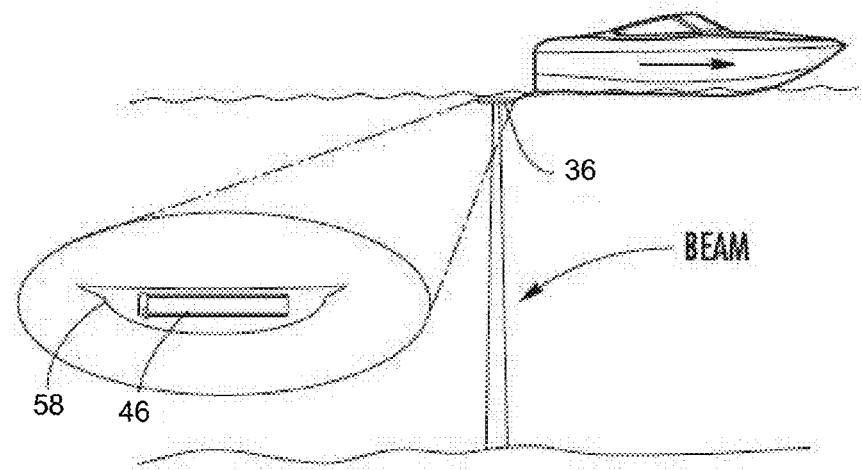
Figure 5B:
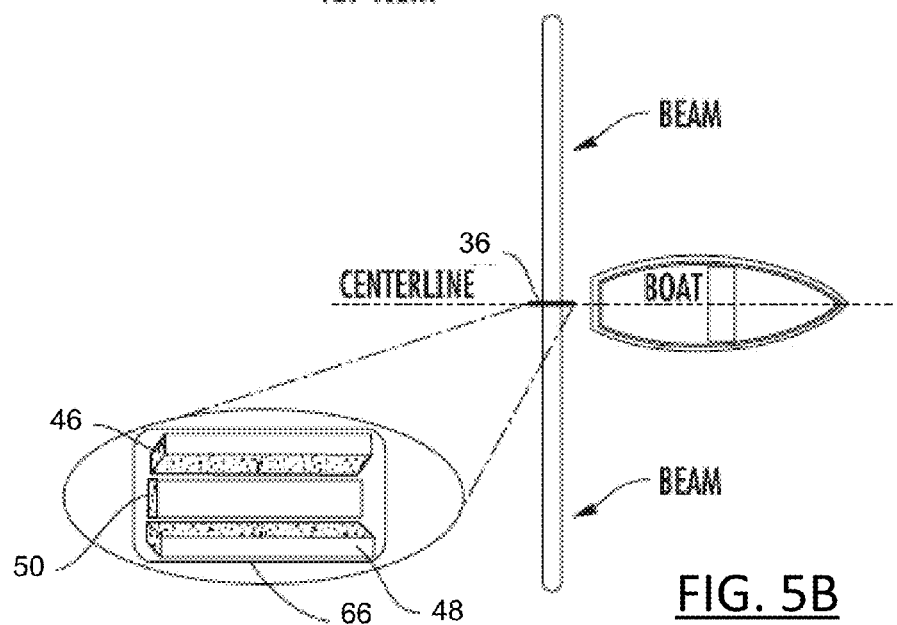
Figure 6:
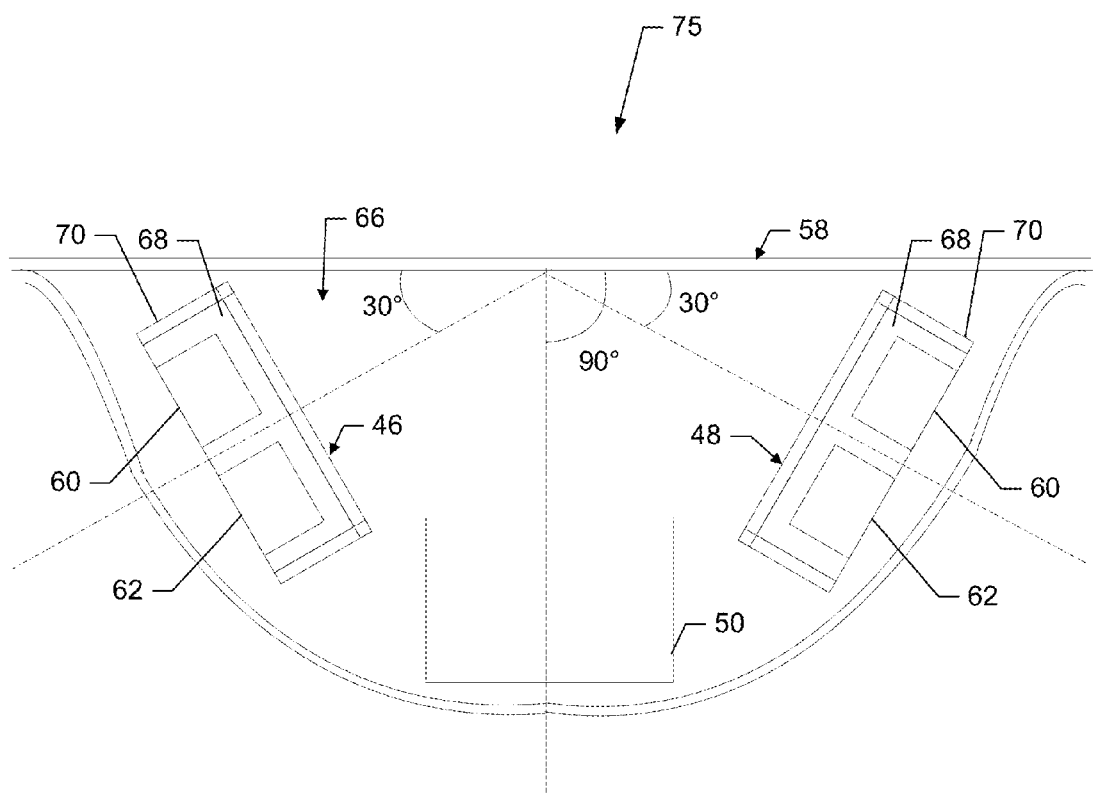
Figure 7:
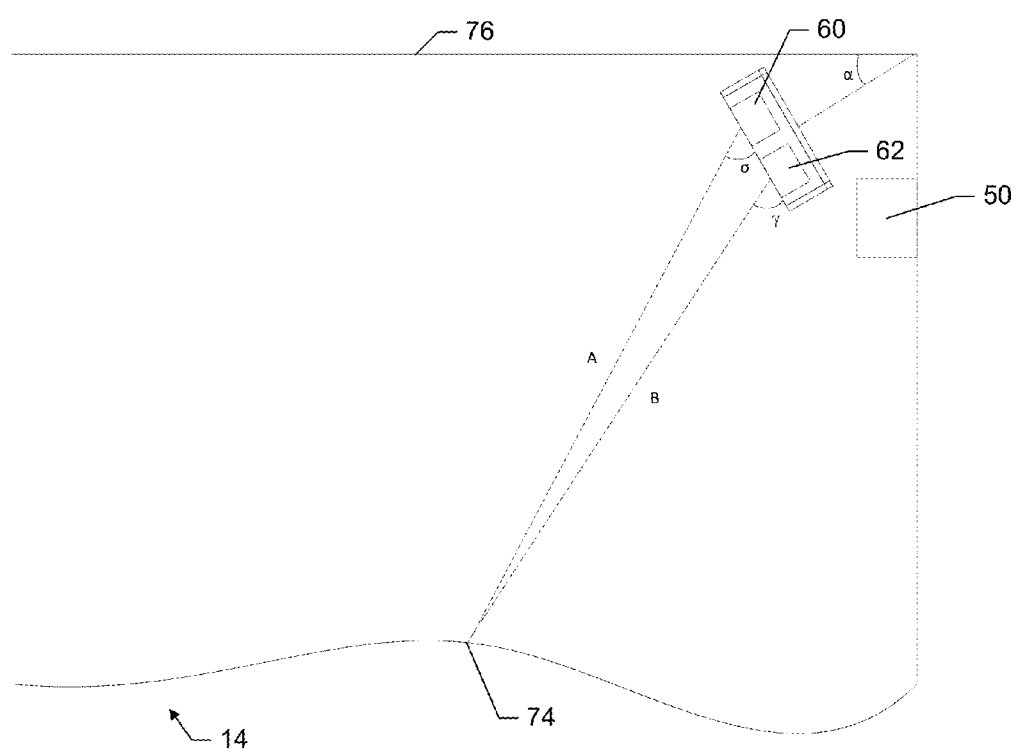
Figure 8:
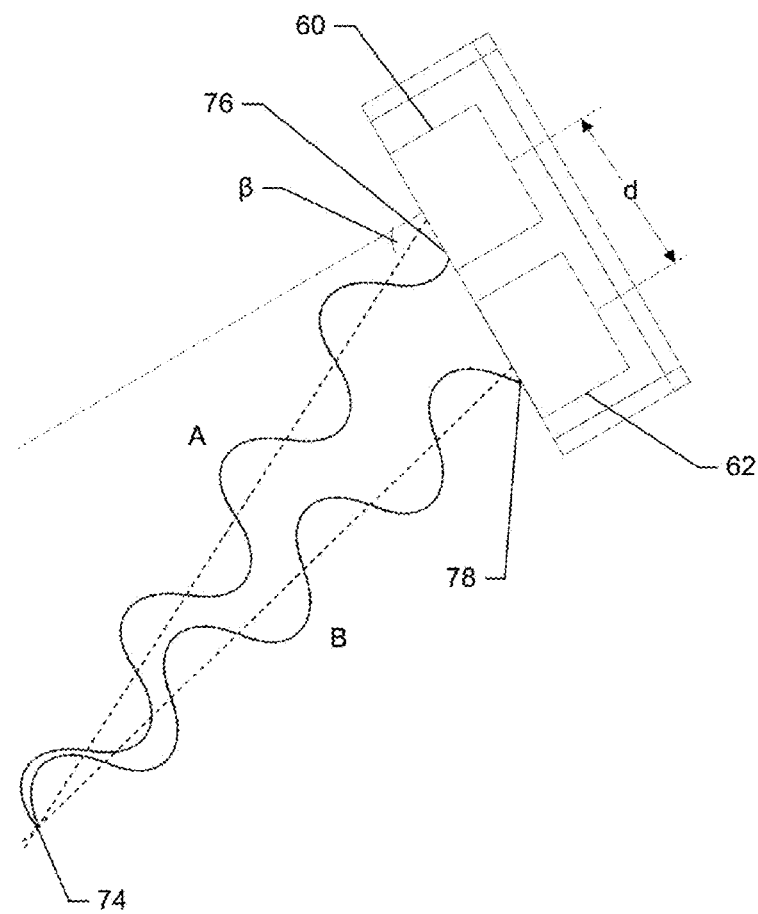
Figure 9:
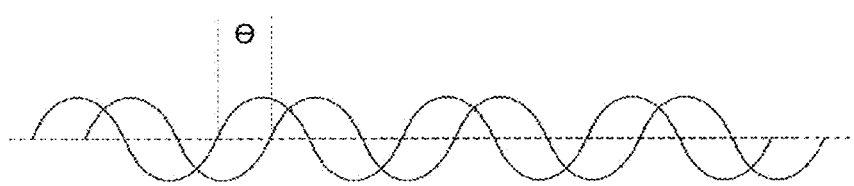
Figure 10:
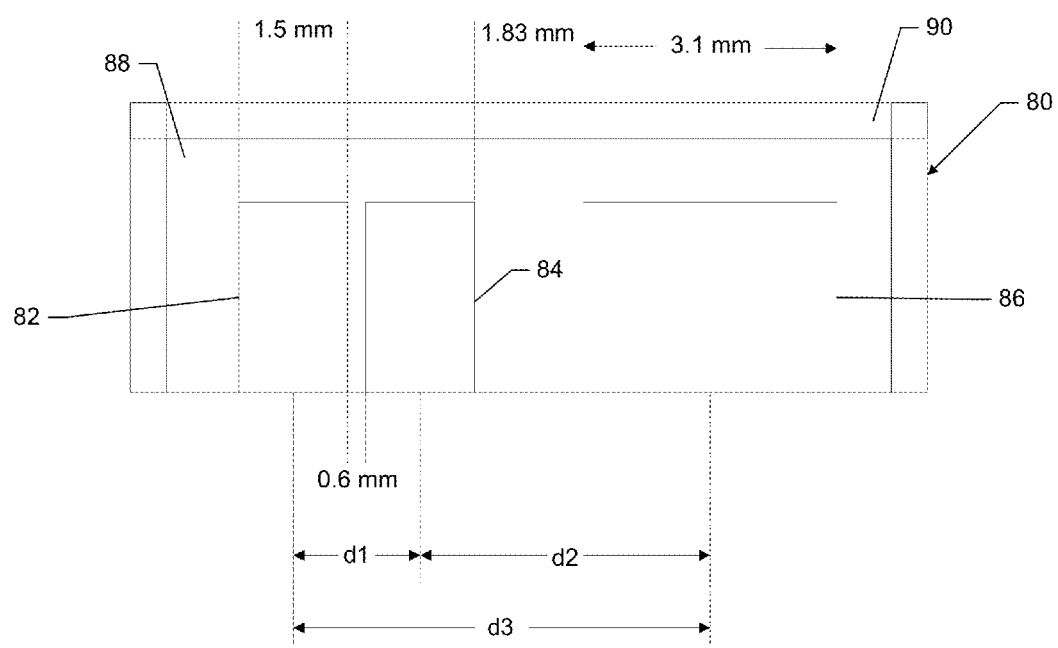
Figure 11A:
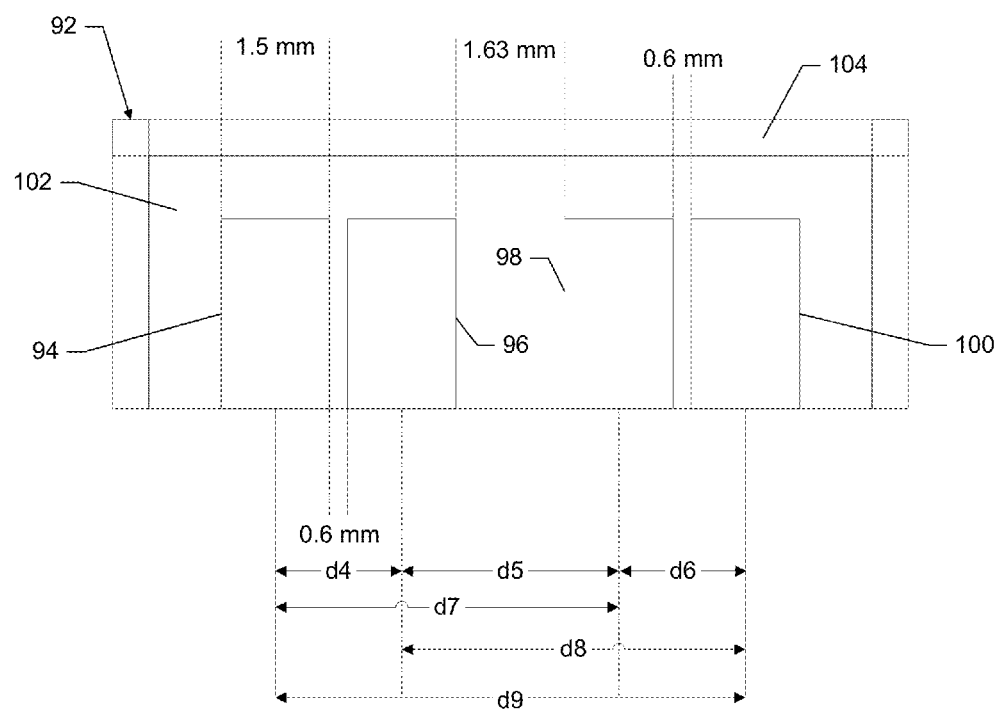
Figure 11B:
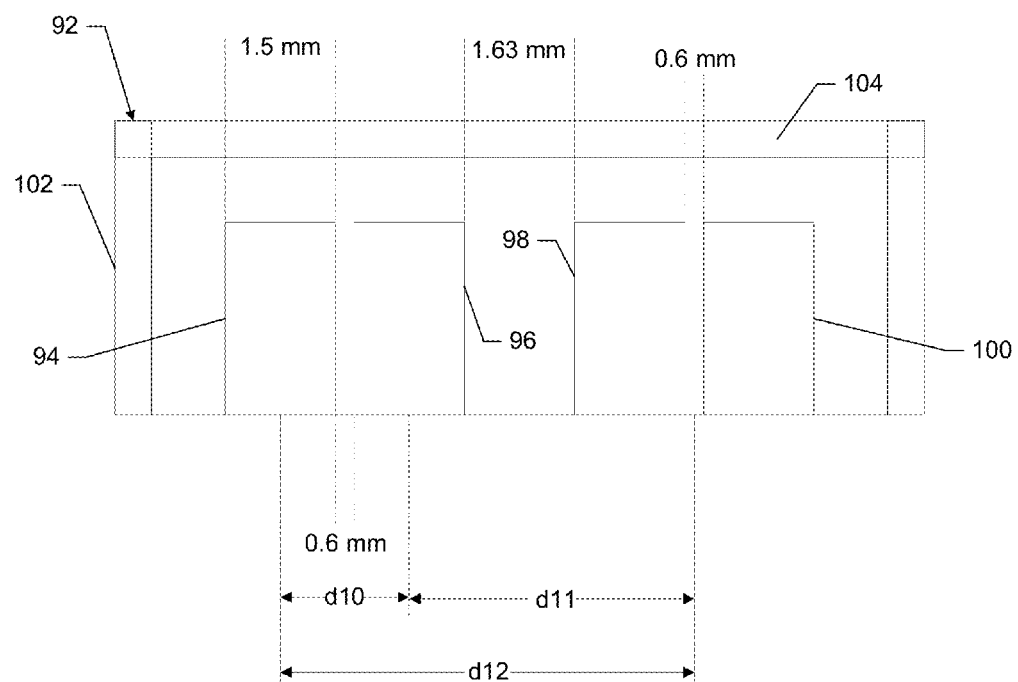
Figure 12:
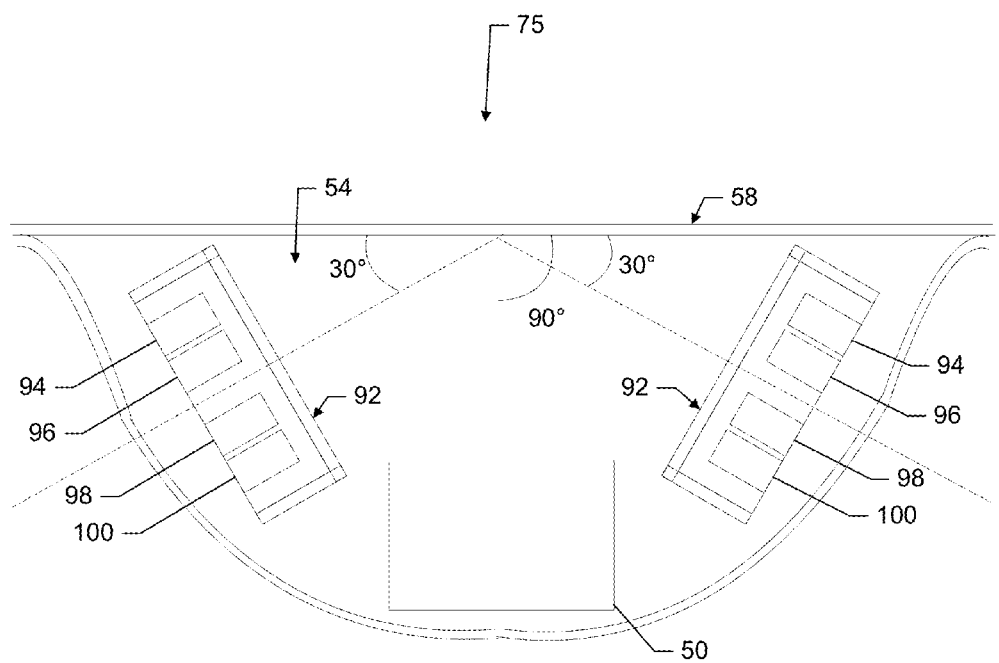
Figure 13:
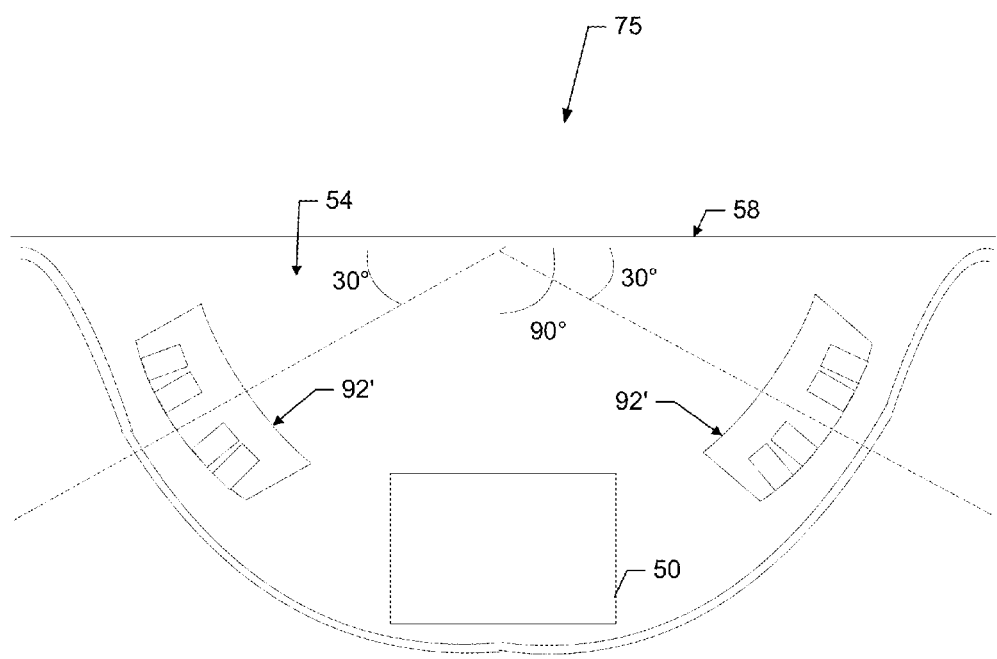
Figure 14:
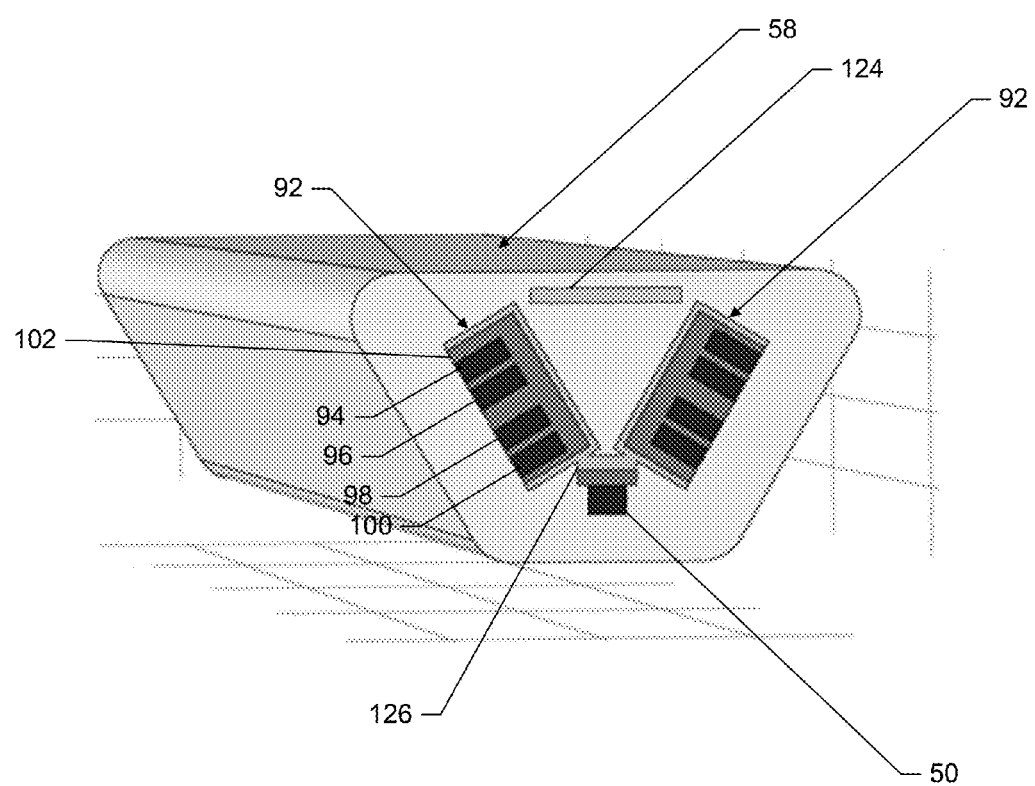
Figure 15:
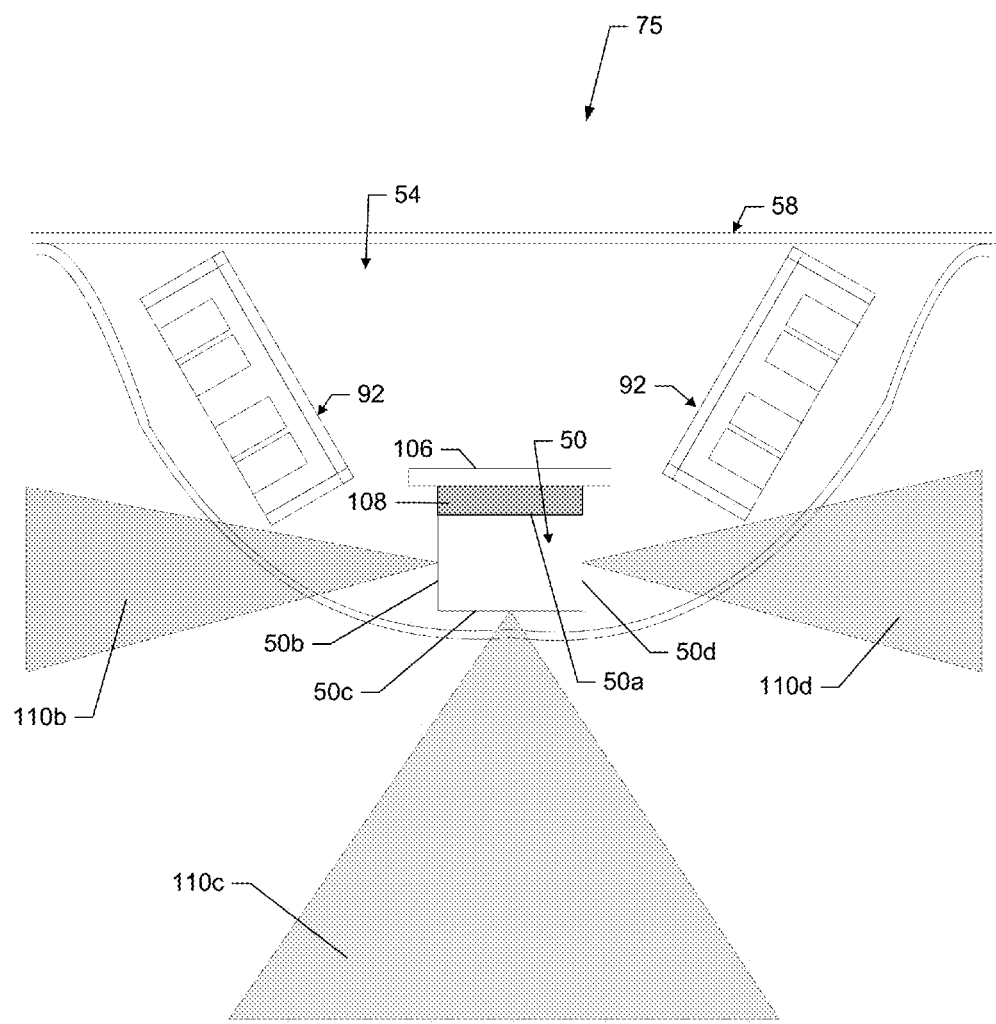
Figure 16:
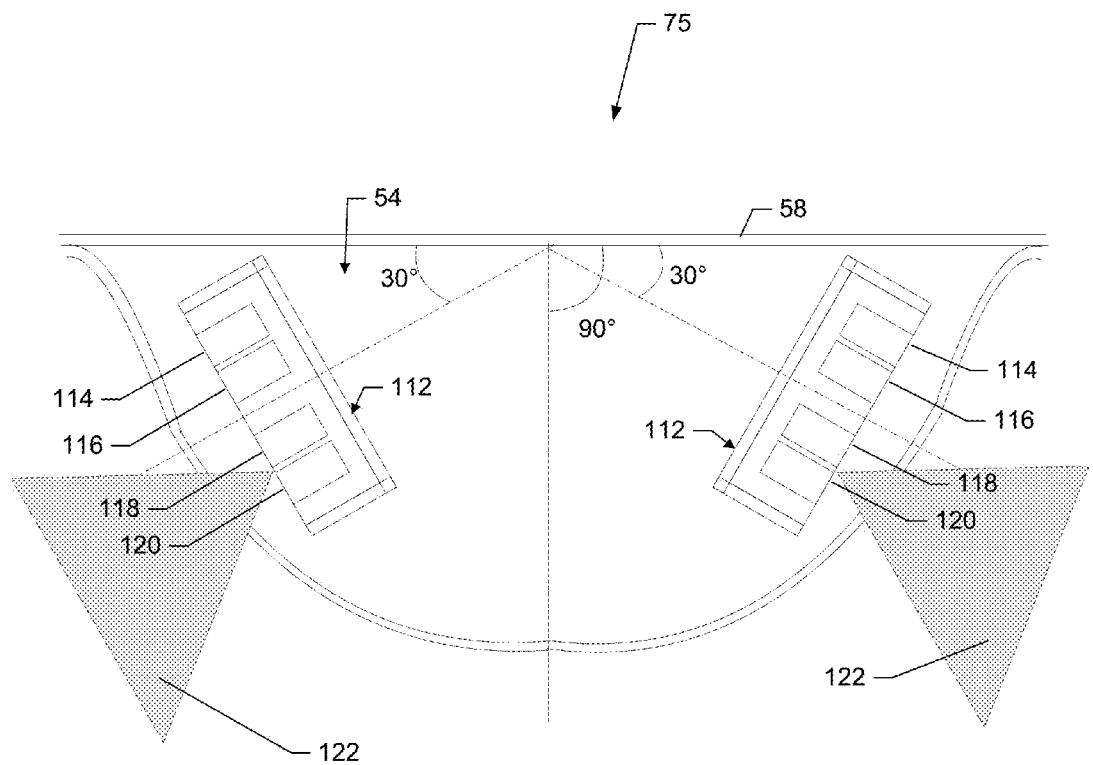
Figure 17:
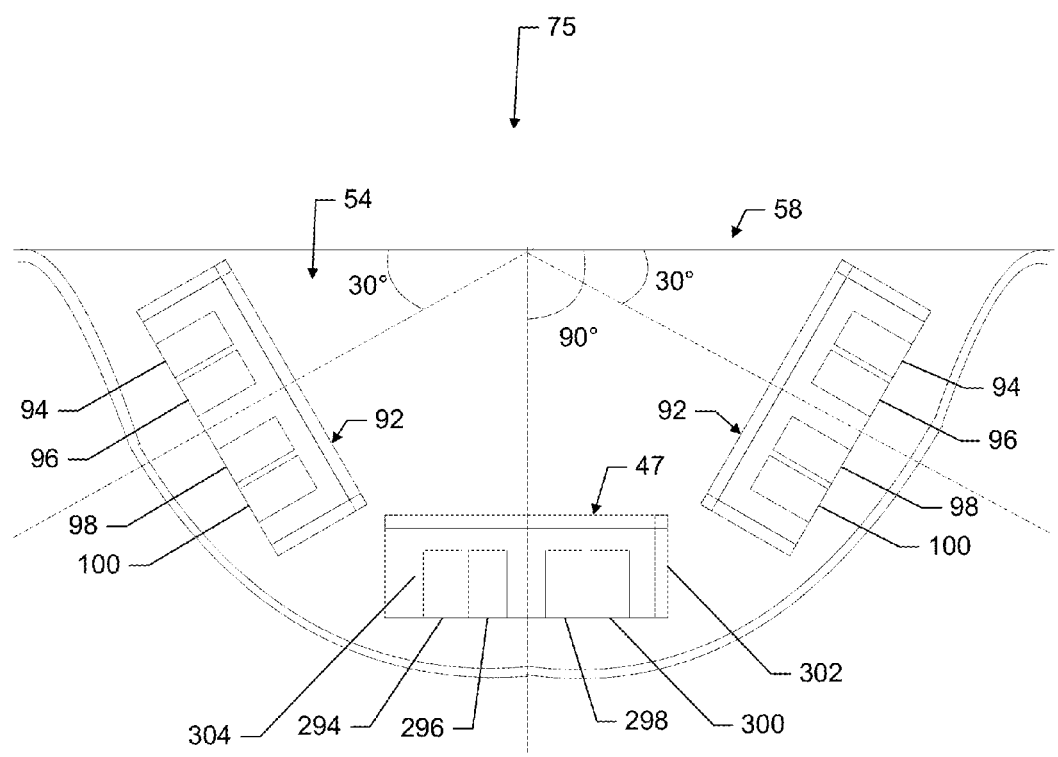
Figure 18:
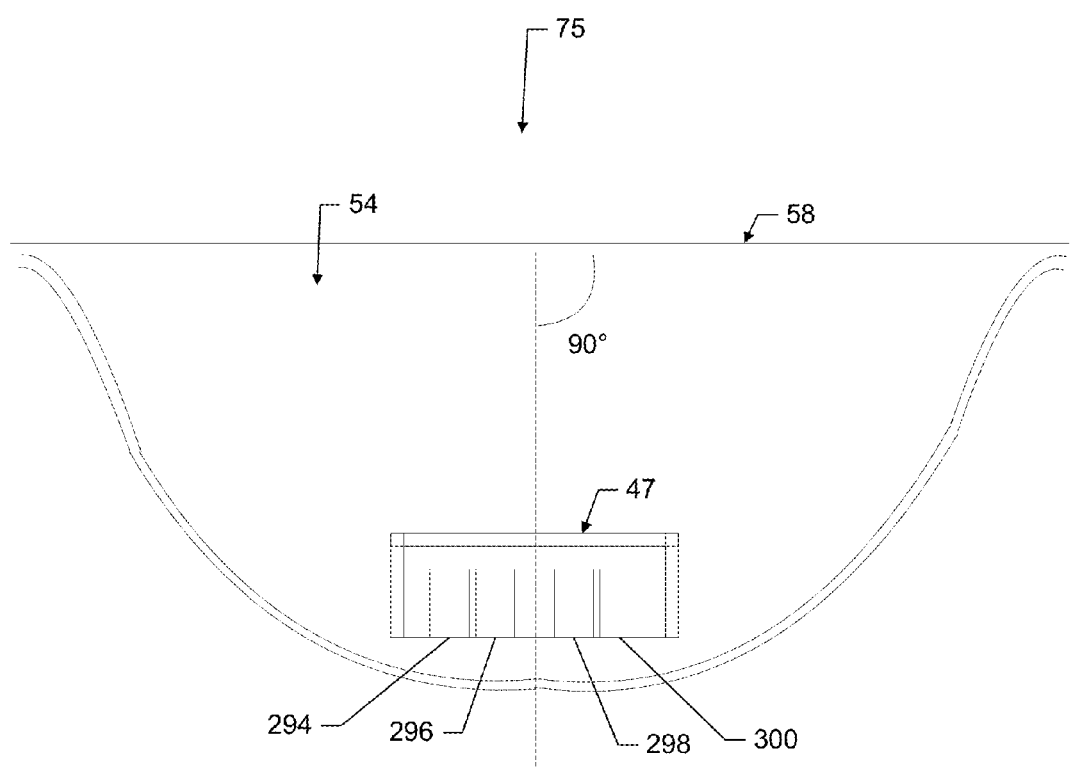
Figure 19:
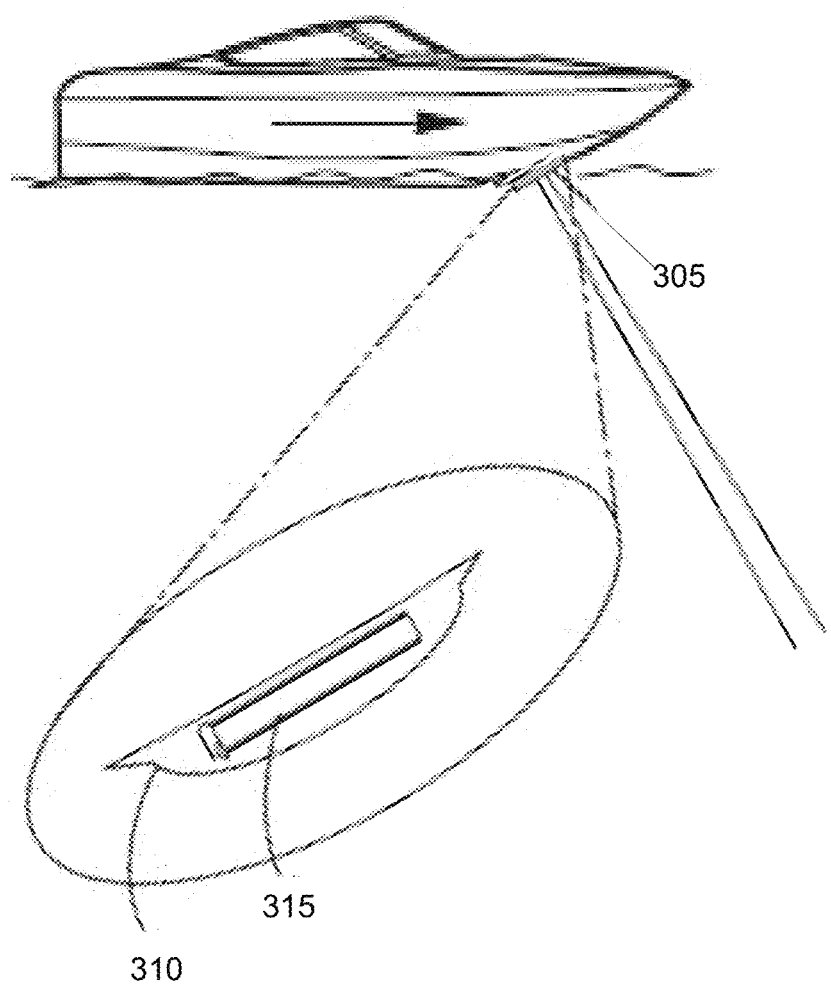
Figure 20:
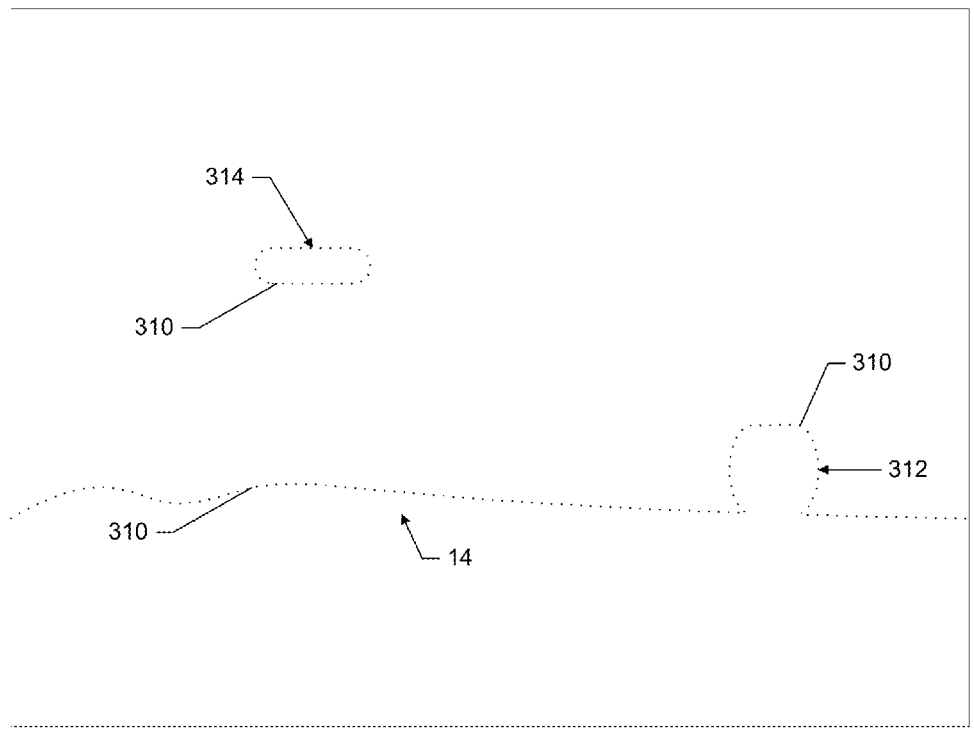
Figure 21:
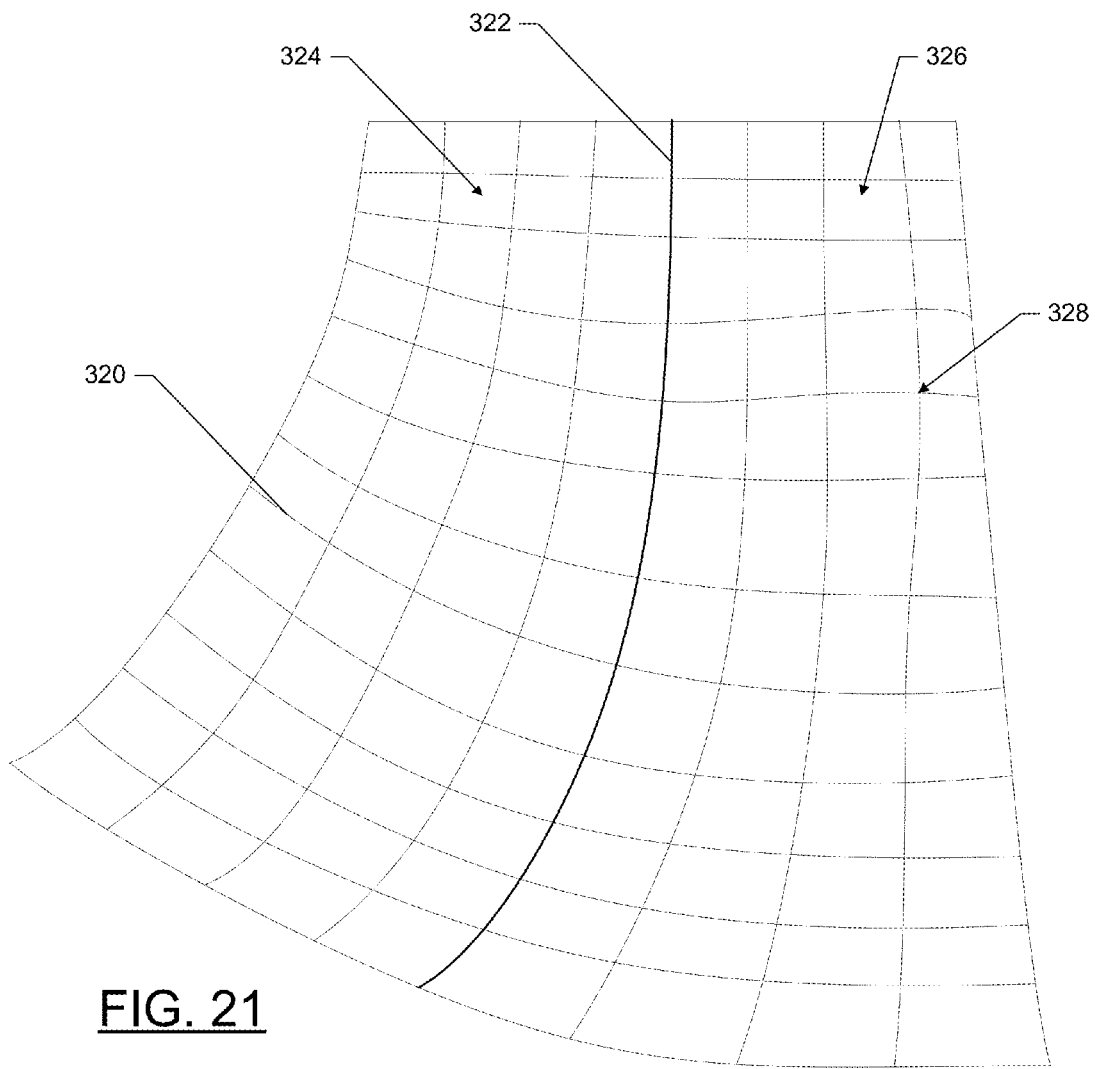
Figure 22:
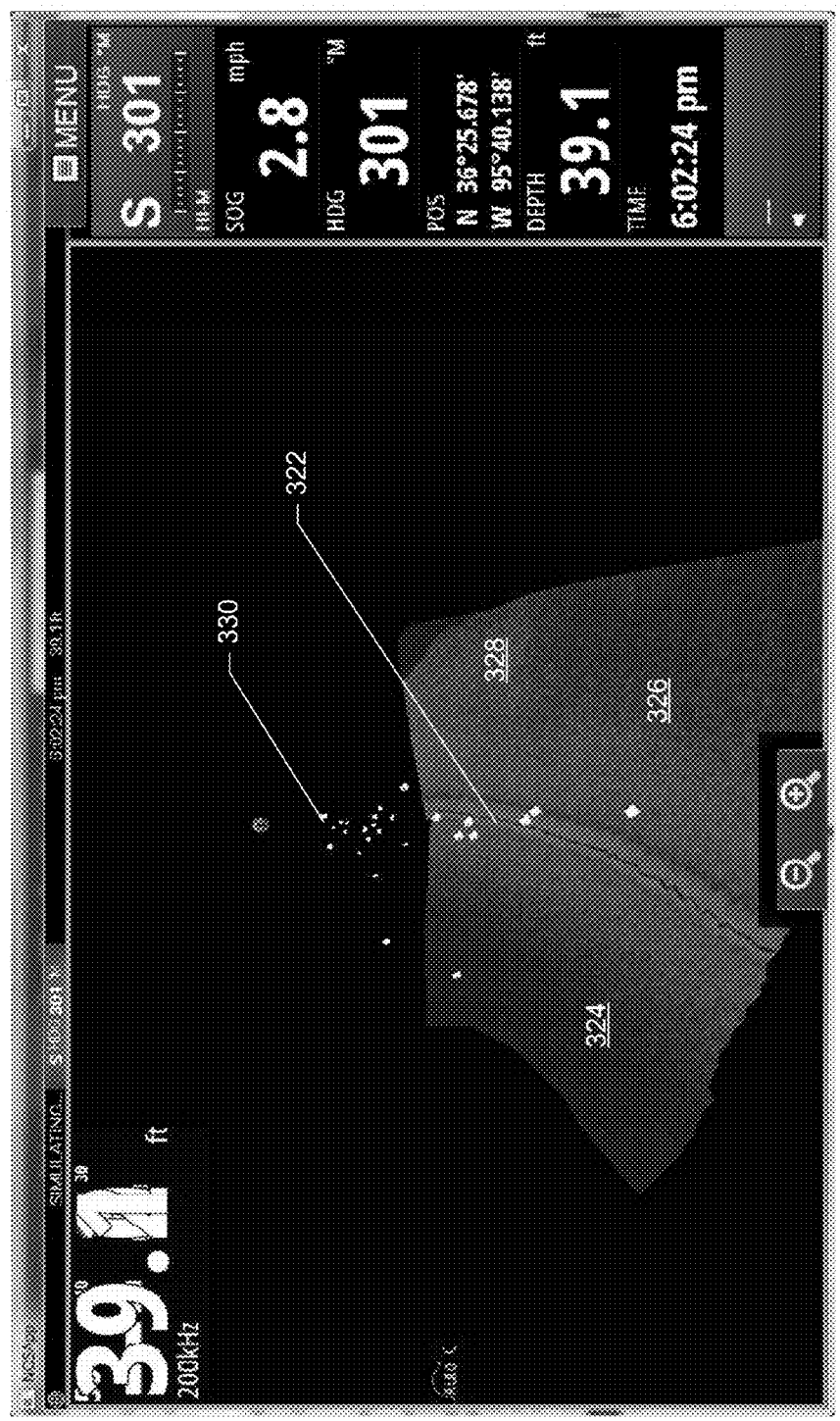
Figure 23:
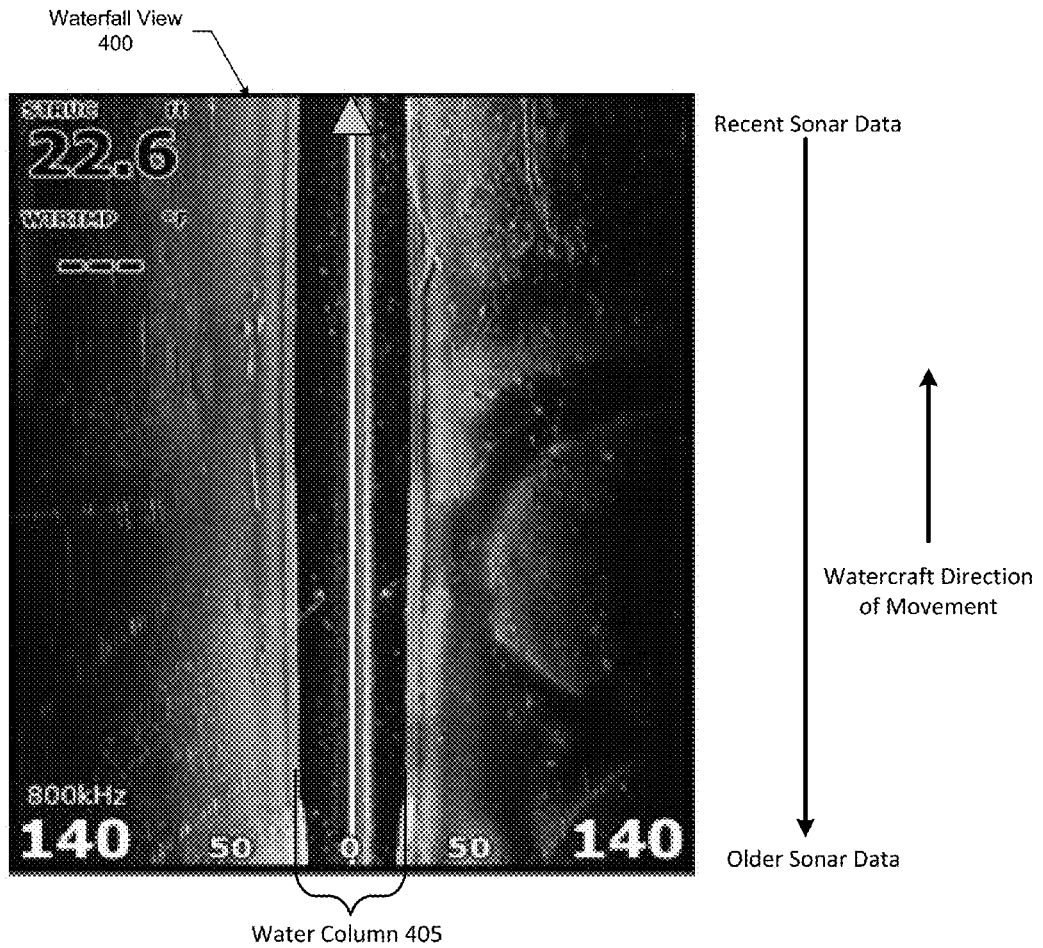
Figure 24:
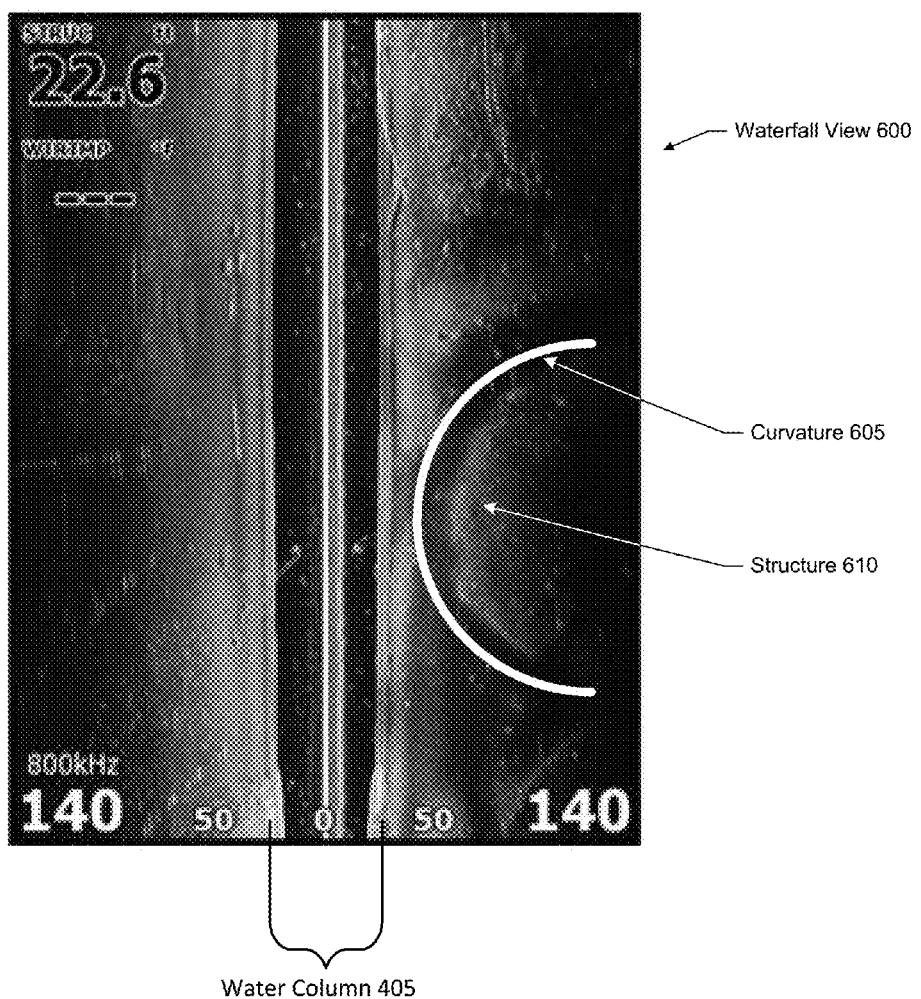
Figure 25:
Figure 26:
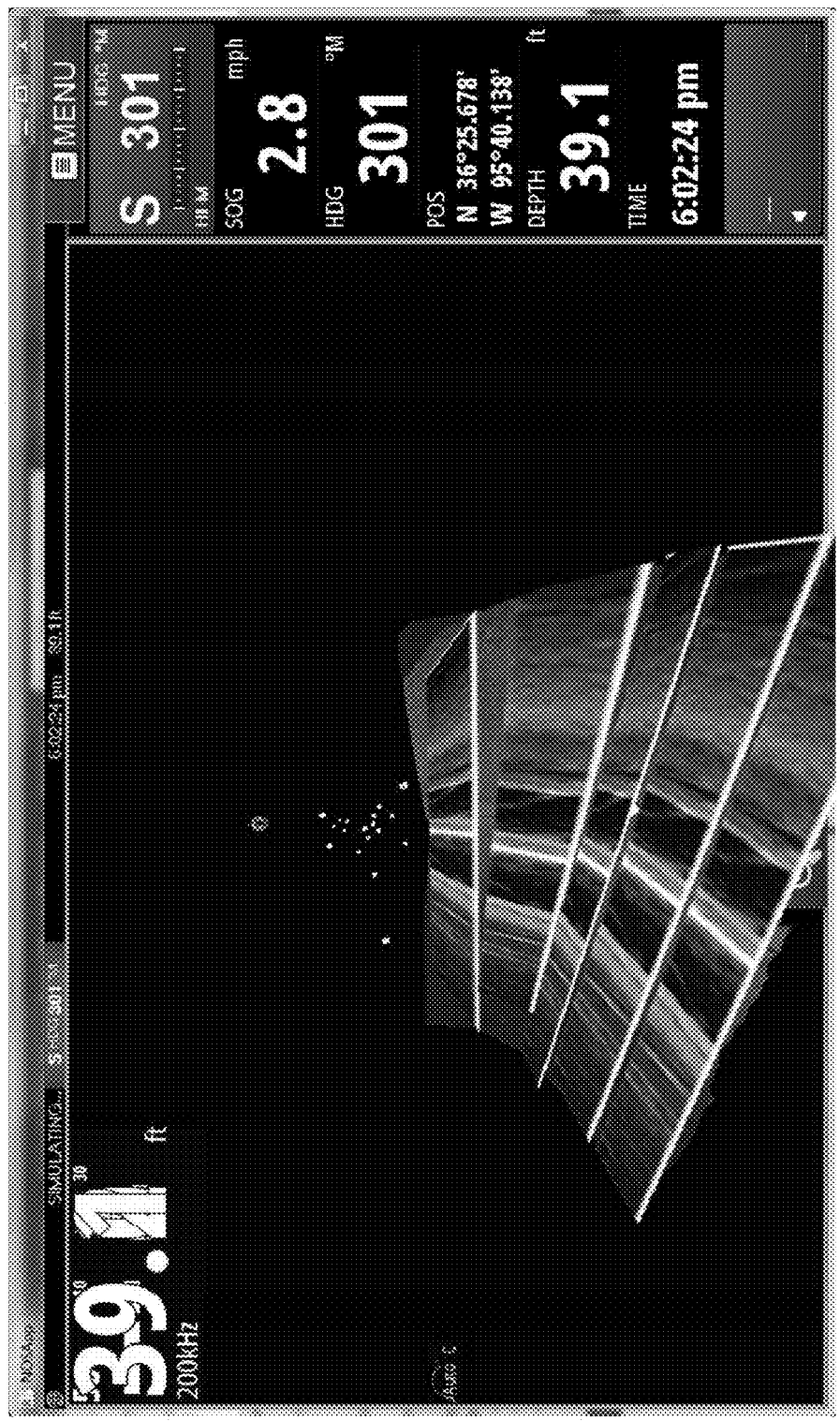
Figure 27:
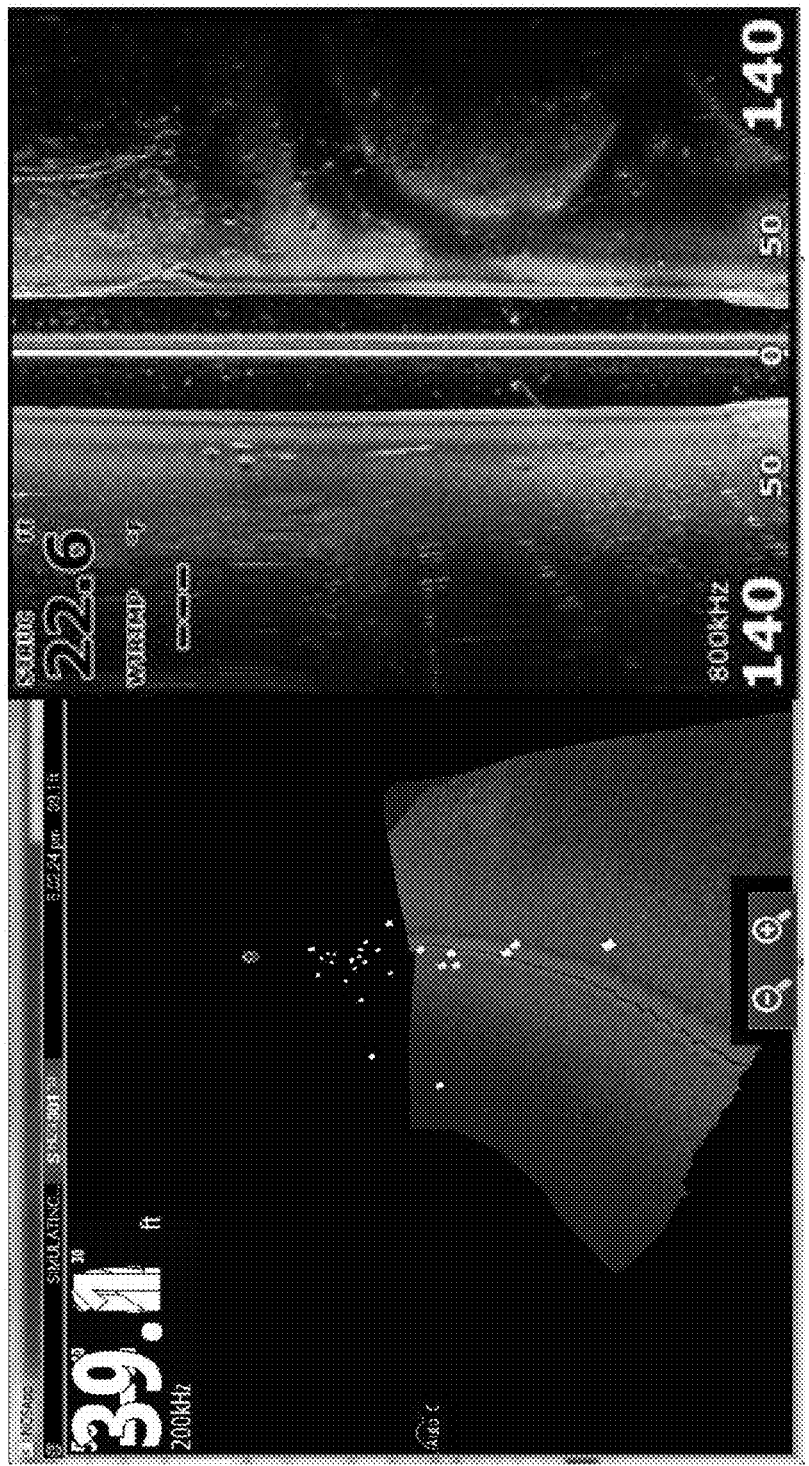
Figure 28:
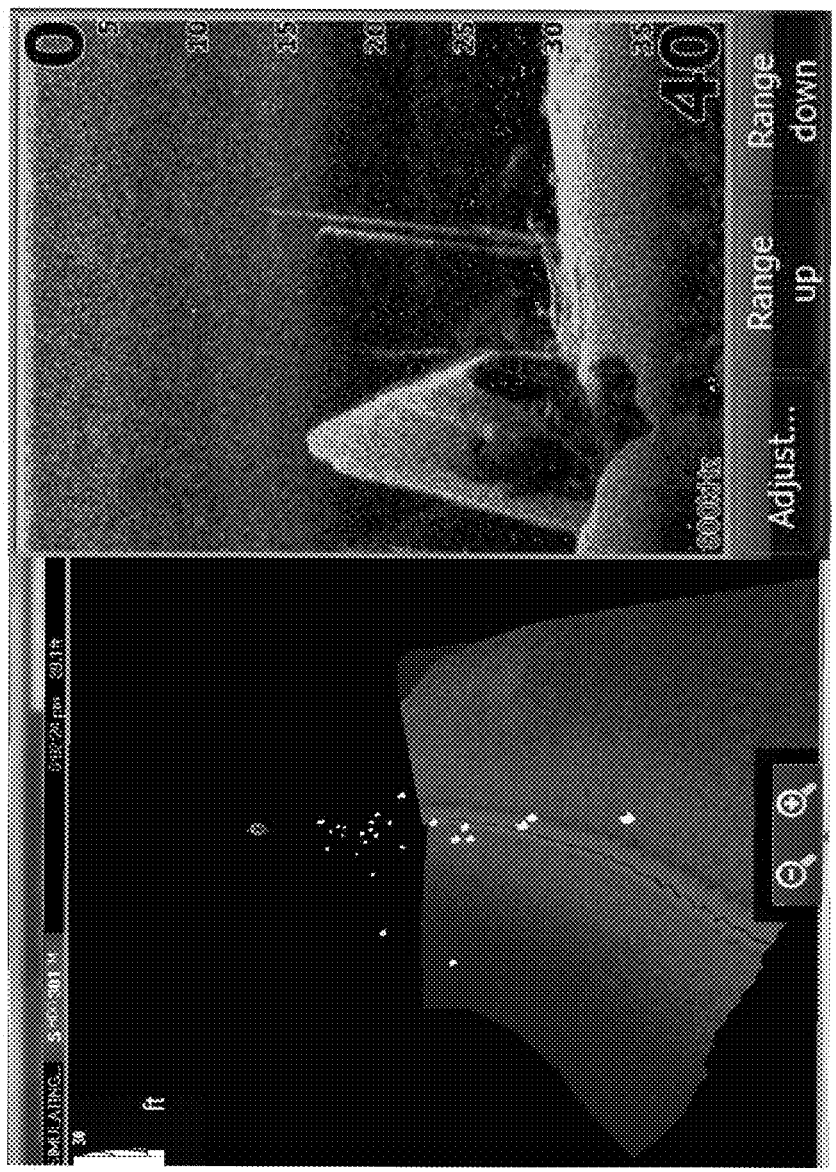
Figure 29:
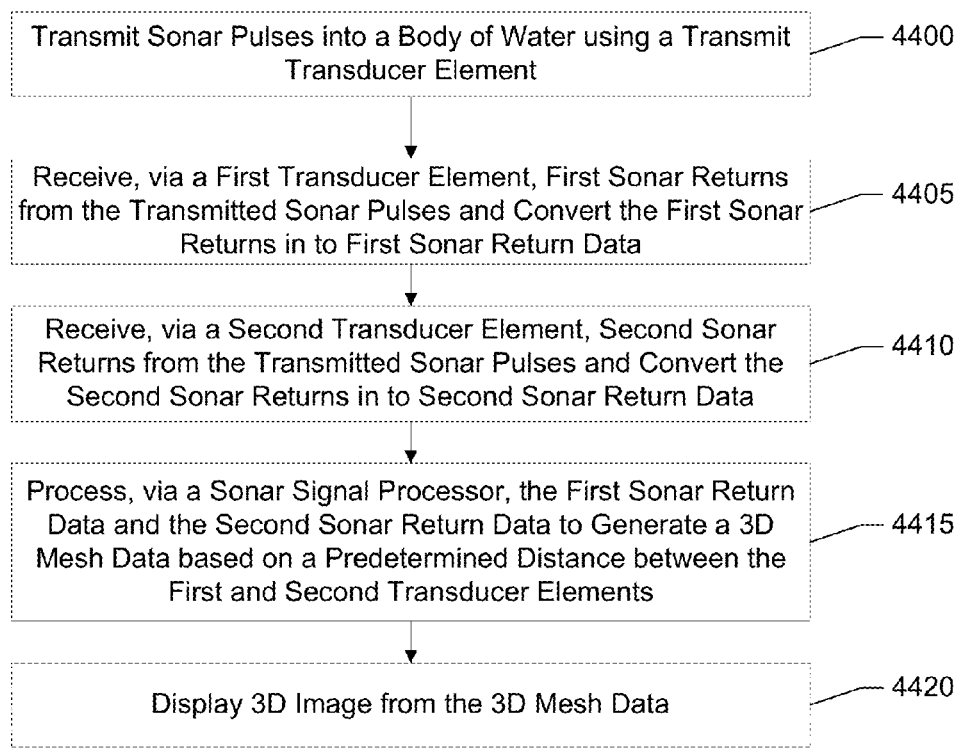
Figure 30:
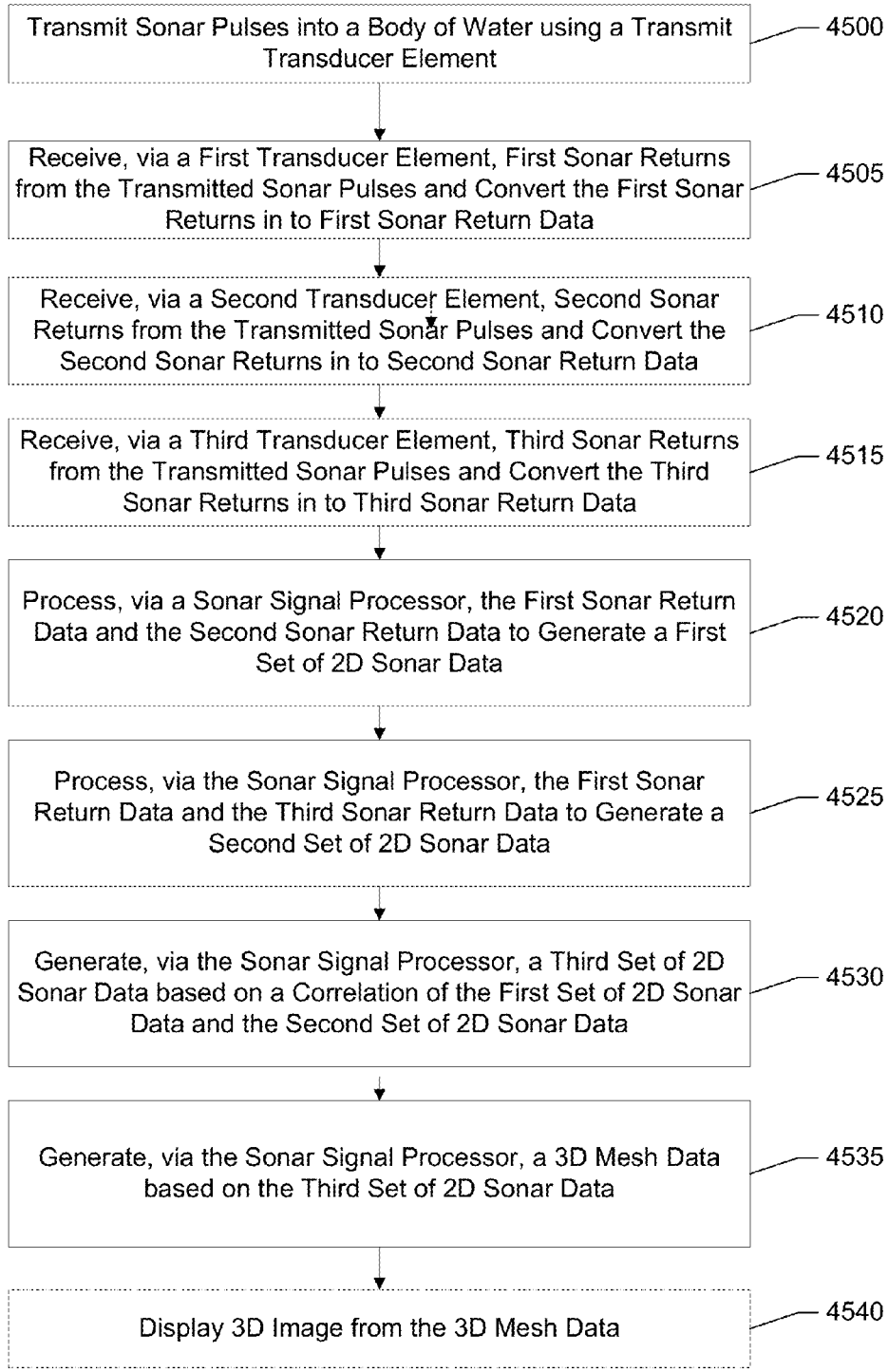
Figure 31:
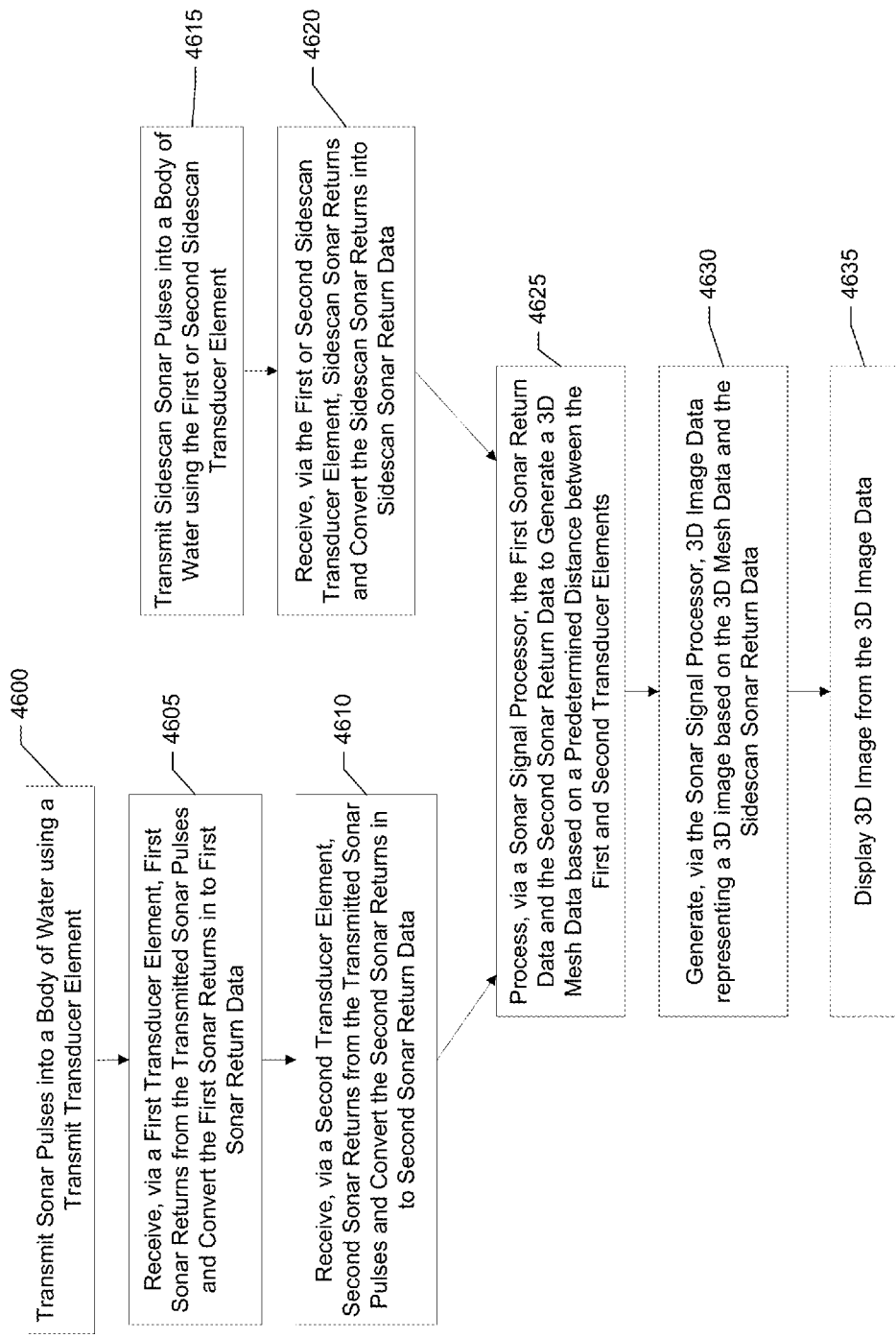
Figure 32:
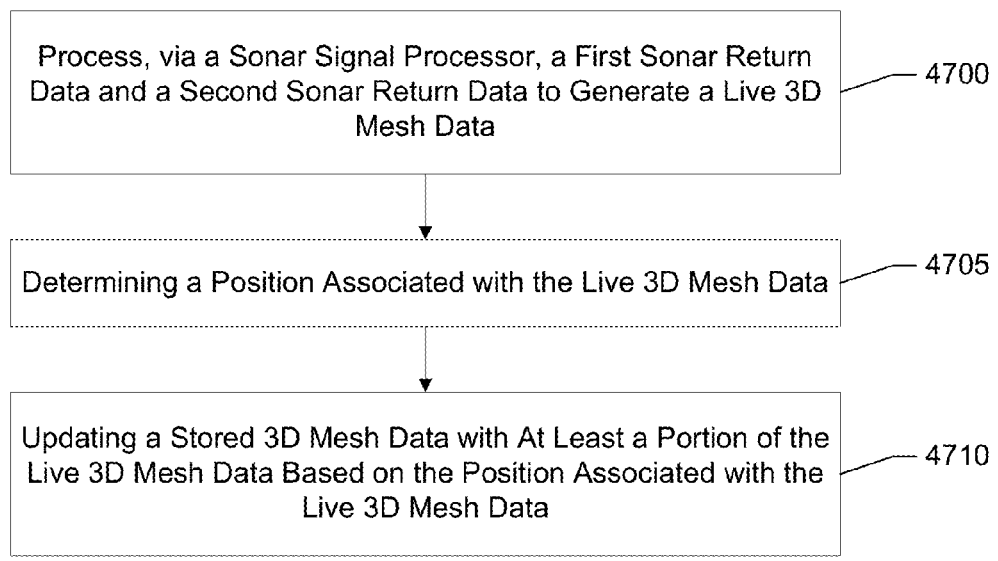

Having thus described the invention in general terms, reference will now be made to the accompanying drawings, which are not necessarily drawn to scale, and wherein:

FIG. 1 shows a diagram illustrating an example of a sonar transducer emitting sonar pulses from a boat;

FIG. 2 shows a basic block diagram illustrating a sonar system in accordance with some embodiments discussed herein;

FIG. 3A shows another basic block diagram illustrating a sonar system in accordance with some embodiments discussed herein;

FIG. 3B shows another basic block diagram illustrating a sonar system in accordance with some embodiments discussed herein;

FIG. 3C shows another basic block diagram illustrating a sonar system in accordance with some embodiments discussed herein;

FIG. 3D shows another basic block diagram illustrating a sonar system in accordance with some embodiments discussed herein;

FIG. 4 shows a basic block diagram illustrating multiple sonar systems connected to a network in accordance with some embodiments discussed herein;

FIG. 5A shows a side view illustrating a beam pattern produced by the transducer assembly according to some embodiments discussed herein;

FIG. 5B shows a top view illustrating a beam pattern produced by the transducer assembly according to some embodiments discussed herein;

FIG. 6 shows a diagram illustrating a cross section of a transducer assembly according to some embodiments discussed herein;

FIG. 7 shows an example simplified transducer array receiving returns from a floor of a body of water according to some embodiments discussed herein;

FIG. 8 shows the transducer array of FIG. 7 having illustrated waves being received by the transducer elements according to some embodiments discussed herein;

FIG. 9 shows a linear transposition of the two waves of FIG. 8 according to some embodiments discussed herein;

FIG. 10 shows a diagram illustrating a cross section of a transducer array according to some embodiments discussed herein;

FIGS. 11A-11B show diagrams illustrating a cross section of another transducer array according to some embodiments discussed herein;

FIG. 12 shows another cross section of a transducer assembly according to some embodiments discussed herein;

FIG. 13 shows yet another cross section of a transducer assembly according to some embodiments discussed herein;

FIG. 14 shows a perspective cross section of a transducer assembly according to some embodiments discussed herein;

FIG. 15 shows a cross section of a transducer assembly illustrating example beam coverage according to some embodiments discussed herein;

FIG. 16 shows another cross section of a transducer assembly illustrating example beam coverage according to some embodiments discussed herein;

FIG. 17 shows another cross section of a transducer assembly having a downscan transducer array according to some embodiments discussed herein;

FIG. 18 shows yet another cross section of a transducer assembly according to some embodiments discussed herein;

FIG. 19 shows a forward-looking transducer assembly according to some embodiments discussed herein;

FIG. 20 shows an example illustration of a 2D slice having point clouds representing sonar returns according to some embodiments discussed herein;

FIG. 21 shows a 3D perspective view of a simplified 3D image according to some embodiments discussed herein;

FIG. 22 shows a smoothed view of the 3D image of FIG. 21 according to some embodiments discussed herein;

FIG. 23 shows a waterfall view of a sidescan sonar image according to some embodiments discussed herein;

FIG. 24 shows a waterfall view of a sidescan sonar image illustrating a watercraft turn according to some embodiments discussed herein;

FIG. 25 shows a side-by-side comparison of images produced by a linear downscan transducer according to some embodiments discussed herein and a conical downscan transducer according to some embodiments discussed herein;

FIG. 26 shows an example output of a sidescan image overlaid onto 3D mesh data to form a 3D image according to some embodiments discussed herein;

FIG. 27 shows an example of a 3D image and sidescan image displayed in a split screen format according to some embodiments discussed herein;

FIG. 28 shows an example of a 3D image and a downscan image displayed in a split screen format according to some embodiments discussed herein;

FIG. 29 illustrates an example method of operating an example sonar system, according to some embodiments discussed herein;

FIG. 30 illustrates another example method of operating an example sonar system, according to some embodiments discussed herein;

FIG. 31 illustrates yet another example method of operating an example sonar system, according to some embodiments discussed herein; and FIG. 32 illustrates an example method of updating a Stored 3D Mesh Data according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Sonar systems, such as sonar depth finders, sidescan sonars, downscan sonars, and sonar fish finders, are commonly employed by boaters, sport fishermen, search and rescue personnel, researchers, surveyors, and others. With reference to FIG. 1, a boat 10 may include a sonar system configured to create electrical pulses from a transceiver. A transducer then converts the electrical pulse into sound waves 12, which are sent into the water. In the depicted embodiment, a fan-shaped sound beam (e.g., a beam shape created from one or more linear transducers) is being transmitted into the water, however, as will be apparent to one of ordinary skill in the art in view of this disclosure, other sound beam configurations (e.g., conical shaped, elliptical shaped, multiple conical shaped, etc.) may be transmitted.

When the sound waves 12 strike anything of differing acoustic impedance (e.g., the sea floor or something suspended in the water above the bottom), the sound waves 12 reflect off that object. These echoes or sonar returns may strike the transducer or a separate receiver element, which converts the echoes back into an electrical signal which is processed by a processor (e.g., sonar signal processor 32 shown in FIG. 2) and sent to a display (e.g., an LCD) mounted in the cabin or other convenient location in the boat. This process is often called "sounding". Since the speed of sound in water may be determined by the properties of the water (approximately 4800 feet per second in fresh water), the time lapse between the transmitted signal and the received echoes can be measured and the distance to the objects determined. This process repeats itself many times per second. The results of many soundings are used to build a picture on the display of the underwater environment.

For example, the sound waves 12 may bounce off the floor 14 of the body of water, an object in the body of water, or another surface in the water, and reflect back to the boat, thereby indicating the distance to the reflective surface in the water at that location. Sometimes, the floor 14 may have an uneven topography (e.g., a raised surface 16) or may have various objects projecting upwardly or suspended in the water column (e.g., trees or fish) that may reflect different depths of the water at different locations. In such a circumstance, the sound waves 12 reflect off the various floor surfaces and back to the boat 10. If the raised surface 16 is closer to the boat 10, the sound waves 12 will reach the boat 10 faster and the sonar system will calculate that the depth is shallower at raised surface 16 than at surface 14. Additionally, objects on the floor (e.g., sunken logs, rocks, wreckage of ships, etc.) reflect the sonar beams and are detected as topographical features. Fish in the water also create their own characteristic sonar returns.

In a downscan configuration, a transducer may transmit sound waves 12 directly down beneath the boat 10 and the transducer or another, receiving transducer, may receive downscan sonar returns from an area generally beneath the boat. The number of downscan returns received over time may produce a plot of the distance traveled by each return, which may illustrate the vertical distance to the surface 14 from which the returns are reflected. In a sidescan configuration, a transducer may transmit sound waves 12 to one or both sides of the boat (e.g., in a fan-shaped beam), and the transducer, or a receiving transducer, may receive the sidescan returns. The number of sidescan returns received over time may produce a horizontal plot of the distance to each return, which may illustrate the profile of the surface 14 to either side of the boat.

Embodiments of the present invention may include multiple transducer elements in either or both of a downscan configuration and a sidescan configuration cooperating to receive returns from the underwater environment. The returns may be compared via the process of interferometry to determine the position from which each sonar return originated. In some embodiments, the return data may generate an angle from the transducer to each position from which the returns are received. The angle value may allow the sonar system to plot the position of the returns in three dimensional space in order to construct a 3D image of the underwater environment.

The active element in a given transducer may comprise at least one crystal. Wires are soldered to these coatings so the crystal can be attached to a cable which transfers the electrical energy from the transmitter to the crystal. As an example, when the frequency of the electrical signal is the same as the mechanical resonant frequency of the crystal, the crystal moves, creating sound waves at that frequency. The shape of the crystal determines both its resonant frequency and shape and angle of the emanated sound beam. Further information regarding creation of sound energy by differently shaped transducer elements may be found in the article "ITC Application Equations for Underwater Sound Transducers", which was published by International Transducer Corporation in 1995, Rev. 8/00, which is hereby incorporated by reference in its entirety.

Frequencies used by sonar devices vary but the most common ones range from 50 KHz to over 900 KHz depending on application. Some sonar systems vary the frequency within each sonar pulse using "chirp" technology. These frequencies are in the ultrasonic sound spectrum and are inaudible to humans.

Example System Architecture

FIG. 2 shows a basic block diagram of a sonar system 30 capable for use with several embodiments of the present invention. As shown, the sonar system 30 may include a number of different modules or components, each of which may comprise any device or means embodied in either hardware, software, or a combination of hardware and software configured to perform one or more corresponding functions. For example, the sonar system 30 may include a sonar signal processor 32, a transceiver 34, and a transducer assembly 36. The sonar system 30 may further include a storage module 37 for storing sonar return data and other data associated with the sonar system in a non-transitory computer readable medium. The sonar system 30 may also include one or more communications modules 38 configured to communicate with one another in any of a number of different manners including, for example, via a network. In this regard, the communications module 38 may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays 40 may be included in the sonar system 30.

With reference to FIG. 4, one or more sonar systems 30 may connect to external systems via the communications module 38. In this manner, the sonar system 30 may retrieve stored data from a remote, external server 52, 54 via a network 56 in addition to or as an alternative to the onboard storage module 37.

The display 40 may be configured to display images and may include or otherwise be in communication with a user interface 42 configured to receive an input from a user. The display 40 may be, for example, a conventional LCD (liquid crystal display), a touch screen display, mobile device, or any other suitable display known in the art upon which images may be displayed. Although the display 40 of FIG. 2 is shown as being connected to the sonar signal processor 32 via the communications module 38 (e.g., via a network and/or via an Ethernet hub), the display 40 could alternatively be in direct communication with the sonar signal processor 32 in some embodiments, or the display 40, sonar signal processor 32 and user interface 42 could be in a single housing. The user interface 42 may include, for example, a keyboard, keypad, function keys, mouse, scrolling device, input/output ports, touch screen, or any other mechanism by which a user may interface with the system. Moreover, in some cases, the user interface 42 may be a portion of one or more of the displays 40.

The transducer assembly 36 according to an exemplary embodiment may be provided in one or more housings (e.g., the housing 58 shown in FIG. 6) that provide for flexible mounting with respect to a hull of the vessel on which the sonar system 30 is employed. In this regard, for example, the housing may be mounted onto the hull of the vessel or onto a device or component that may be attached to the hull (e.g., a trolling motor or other steerable device, or another component that is mountable relative to the hull of the vessel), including a bracket that is adjustable on multiple axes, permitting omnidirectional movement of the housing.

The transducer assembly 36 may include one or more transducer elements positioned within the housing, as described in greater detail below. In some embodiments, each of the transducer elements may be positioned within the housing so as to point toward a predetermined area under or to the side of the vessel. For example, some example transducer assemblies (e.g., shown in FIGS. 6, 12-18) are configured such that the transducer elements are oriented within the housing such that one or more transducer elements face generally downwardly (e.g., a downscan transducer element 50 shown in FIG. 3A or downscan transducer assembly 47 shown in FIGS. 3C-3D) and two or more other transducer elements may additionally or alternatively face generally outwardly and downwardly (e.g., sidescan transducer arrays of FIGS. 3A, 3B, and 3D).

Referring to FIG. 3A, in some embodiments, the transducer assembly 36 may include a first sidescan array 46 and a second sidescan array 48. Each array may have one or more transducer elements, which may include one or more transmitting elements, one or more receiving elements, and one or more transmit/receive elements, as detailed below. In some embodiments, the transducer assembly 36 may additionally include a downscan transducer 50, which, in some embodiments, may be configured as a transmit/receive element.

In some alternative embodiments, as shown in FIG. 3B, the transducer assembly 36 may not include a downscan transducer. In such embodiments, as detailed herein, the sidescan sonar arrays 46, 48 may each be configured to transmit sonar pulses and receive sonar returns.

Turning to FIG. 3C, another embodiment of the present invention may include a transducer array in the downscan configuration. Such a downscan transducer array 47 may transmit sonar pulses with one or more transducer elements and may receive sonar returns with one or more transducer elements in a manner similar to the sidescan transducer arrays 46, 48 detailed above. Additionally or alternatively, the downscan transducer array 47 may be used alone or in combination with one or more sidescan transducer arrays 46, 48 as shown in FIG. 3D. As detailed herein, description of various embodiments of a "transducer array" may apply to each of the sidescan 46, 48 or downscan 47 transducer arrays unless otherwise specified.

Example Sidescan Interferometry

As detailed herein, embodiments of the present invention may generate 3D mesh data by interferometrically processing returns from the same area of the underwater environment with two or more transducer elements to determine the angle of each return and plot the returns in 3D space to generate a 3D image. With reference to FIGS. 5A and 5B, the transducer assembly 36 may emit a fan shaped beam downwardly and outwardly from either side of the boat. The fan-shaped beam may have a relatively narrow beamwidth in a direction parallel to a fore-to-aft direction of the vessel and a relatively wide beamwidth in a direction perpendicular to the fore-to-aft direction of the vessel. In some embodiments, as detailed below, the downscan transducer 50 transmits the fan-shaped beam, and the sidescan transducer arrays 46, 48 receive returns from the sonar pulses transmitted by the downscan transducer. In some alternative embodiments, one or more elements of the sidescan transducer arrays 46, 48 may transmit sonar pulses. Alternatively, as described in greater detail below, a downscan transducer array (e.g., the downscan transducer array 47 of FIGS. 3C, 3D) may be used, either alone or in combination with additional arrays, in a similar manner to the sidescan transducer arrays detailed herein.

Turning to FIG. 6, a cross-sectional view of an example transducer assembly 75 is shown. Each sidescan transducer array 46, 48 is shown having two transducer elements 60, 62. In some embodiments, the downscan transducer 50 transmits sonar pulses at least downwardly in a fan-shaped beam (e.g., shown in FIGS. 5A-5B), and each of the sidescan transducer arrays 46, 48 is configured to receive returns from the underwater environment on its respective side of the housing. The sidescan transducer arrays 46, 48 may be oriented downwardly and outwardly in their respective directions.

While traditional sidescan may utilize a single sidescan transducer element on either side of the housing for receiving sidescan sonar returns, embodiments of the present invention may use at least two sidescan transducer elements 60, 62 positioned in a sidescan transducer array 46, 48 on the same side of the housing 58. In such embodiments, the sidescan transducer elements 60, 62 may be positioned in parallel mounting slots of an absorptive material 68 within each respective transducer array 46, 48. As discussed in greater detail below, the transducer arrays 46, 48 may include a shielding material 70 for preventing interference between transducers and improving the return data.

With continuing reference to FIG. 6, the transducer arrays 46, 48 may be held at a predetermined angle relative to the surface of the body of water. For example, the emitting surfaces of the transducer arrays 46, 48 may be oriented at 30 degrees from the surface of the body of water in order to transmit and/or receive sonar pulses. In some embodiments, an emitting surface of the downscan transducer 50 may be perpendicular to the surface of the body of water. The transducer elements 60, 62 may also be positioned at a predetermined distance from each other (e.g., a predetermined distance between the centers of the transducer elements, also referred to as element pitch). The predetermined distance may be designed based on the frequency or wavelength of the sonar pulses. For example, the predetermined distance between the transducer elements 60, 62 may be a fraction or multiple of the wavelength of the sonar pulses (e.g., 1/10, 1/8, 1/6, 1/4, 1/2, 1, 2, 3, or 4 times the wavelength). In some embodiments, the predetermined distance may be less than or equal to half the wavelength of the sonar pulses, as discussed below. In other embodiments, as detailed herein, the predetermined distance may be greater than or equal to half the wavelength of the sonar pulses.

Turning to FIG. 7, a simplified example is shown of the sidescan transducer elements 60, 62 receiving returns from a single point 74 on the floor of the body of water or other reflecting surface to generate a point of return data including a distance and/or time to the point as well as an angle α. During actual interferometric sonar sounding, sonar returns may be received from across the entire beam width of the transmitted sonar pulses to generate a plurality of points of return data in two-dimensional slices from each transmitted sonar pulse. In the embodiment shown in FIG. 7, the downscan sonar transducer 50 may transmit sonar pulses in a fan-shaped beam towards the floor 14 of the body of water. The returns A, B may originate at the same time from the same point 74 and be received by the first 60 and second 62 transducer elements respectively.

Each of the sidescan transducer elements 60, 62 may produce one-dimensional distance data in response to receiving sonar returns A, B, respectively, from the point 74. The sonar signal processor may combine this one-dimensional distance data from each element with the predetermined distance between the elements and the angle α between the orientation of the transducer array 46, 48 and the surface of the body of water to determine the position of the point 74 of origin of the sonar return. The position of the point 74 may be represented as two-dimensional coordinates with respect to the boat or housing, or may alternatively be represented as a distance and angle from the boat or housing. In yet another embodiment, the position may be determined as an absolute position value by comparing the interferometric data with GPS or other positioning data. For example, if the first transducer element 60 receives returns from the point 74 at a distance of 6.01 feet away (e.g., determined as the speed of the returns over the time from transmission to receipt halved) and the second transducer element 62 receives returns from the point 74 at 5.99 feet away, the sonar system may determine the angle to the point 74. For simplicity of example, if the predetermined distance between elements is 0.1 feet, the sonar signal processor may triangulate the angle α between the first transducer element 60 and the first sonar return A as approximately 78 degrees and the angle γ between the second transducer element 62 and the second sonar return B as approximately 78.9 degrees. As detailed herein, the angle may be determined relative to any reference point based on the distance (time) data.

In some embodiments, the location of the point of origin for the sonar returns may be determined via a phase difference between the returns received at the respective transducer elements 60, 62. Turning to FIG. 8, another simplified example of a transducer array 46, 48 receiving sonar returns A, B is shown. In this embodiment, the sonar returns from the point 74 are represented as waves A, B received by the first 60 and second 62 sidescan transducer elements. The returns A, B originating from the same point 74 on the floor of the body of water or other reflecting surface may have substantially the same frequency, amplitude, and wavelength. Given that the waves A, B may be expected to have the same properties when received at both the first 60 and second 62 sidescan transducer element, a phase difference between the two waves, in combination with the predetermined distance and angle of the transducer array, may provide the location of their point 74 of origin. As shown in FIG. 8, the returns A, B may be received by the respective transducer elements 60, 62 at different positions 76, 78 along the respective waves. The phase, or position, of the wave at the point it is received by the transducer elements may be compared to determine the angle of the point 74 of origin.

FIG. 9 shows a plot overlaying the returns A, B as received by each transducer element 60, 62 versus time. The phase difference θ between the returns A, B may indicate the degree of offset between the returns, which, when combined with the predetermined distance d, one-dimensional distance data, frequency of the returns, and/or angle of the transducer arrays may produce the position of the point 74 of origin. The angle β to the point 74 may be represented by the following Equation (1):

$$\beta = \arcsin\left(\frac{\lambda\theta}{2\pi d}\right) \quad (1)$$

Where λ represents the wavelength of the return, θ represents the received phase difference, and d represents the predetermined distance.

In some alternative embodiments, a transducer array may include a sidescan element and a downscan transducer element each configured to receive sonar returns from overlapping regions of the underwater environment. In such embodiments, the sonar returns from the overlapping regions may be used to determine an angle to the point of origin of each of the sonar returns in a similar manner to the transducer arrays described herein. In some embodiments, the sonar signal processor may be configured to compensate for any difference in size or orientation of the respective downscan and sidescan elements.

In some embodiments, the transducer arrays may include more than two transducer elements. For example, FIG. 10 shows an embodiment of the transducer arrays 80 having three transducer elements 82, 84, 86 positioned in mounting slots formed by an absorption material 88. The array 80 may further include shielding 90 as detailed herein. Each of the transducer elements 82, 84, 86 may be positioned a predetermined distance d1, d2, d3 from each other. In some embodiments, the distance between elements may differ. For example, in the embodiment shown in FIG. 10, the center 84 and left 82 elements are positioned 0.6 mm (~0.0236 inches) apart, and the center 84 and right 86 elements are positioned 1.83 mm (~0.0720 inches) apart. In some embodiments, each element may be the same size (e.g., 1.5 mm (~0.05906 inches) wide). In some alternative embodiments, one or more of the elements (e.g., element 86 of FIG. 10) may differ in size from the remaining elements (e.g., 3.1 mm (~0.12205 inches) in the embodiment of FIG. 10).

In some further embodiments, the predetermined distance between elements may be nonredundant, such that each pair of elements is spaced at a different predetermined distance. For example, in FIG. 10, each predetermined distance d1, d2, d3 may be different, such that d1 is less than d2, which are both less than d3. Alternatively, the spacing between elements may be interchanged (e.g., such that d1 is greater than d2). As detailed below, the nonredundant predetermined distances d1, d2, d3 may allow each sub-array (e.g., each pairwise array within the transducer array) to generate a unique solution during the interferometric sounding process. In some alternative embodiments, the elements may be evenly spaced.

In some embodiments, the transducer elements 82, 84, 86 may be used in pairwise sub-arrays to generate more robust return data. For example, in the embodiment shown in FIG. 10, the first 82 and second 84 elements may be used to determine the two dimensional return data of the positions of sonar returns in a manner similar to the two-element embodiments described herein (e.g., using a phase difference between the respective returns). Similarly, the second 84 and third 86 elements may generate the two dimensional return data of the positions of the floor of the body of water or other reflecting surface (e.g., fish, objects, etc.). The first 82 and third 86 elements may also generate the two dimensional return data of the positions of the floor of the body of water or other reflecting surface as detailed herein. Alternatively, any subset of the individual pairs may be used. As detailed below, each of the pairwise sets of return data may then be correlated (e.g., combined, compared, among others) to generate a more robust set of return data.

These elements 82, 84, 86 may be electrified substantially simultaneously to receive the return data, and each of the pairwise comparisons may then be generated from the received data by the sonar signal processor. In some alternative embodiments, each of the pairs (e.g., the first 82 and second 84 elements, the first 82 and third 86 elements, and the second 84 and third 86 elements) may be sequentially electrified to receive sonar returns separately. In some embodiments, the transmitting transducer(s) may be electrified to transmit a sonar pulse and the receiving transducer(s) may be electrified at a predetermined time thereafter to receive the sonar returns from the transmitted pulse. In the sequential embodiments detailed herein, a single sonar pulse may be transmitted for all of the received pairwise returns (e.g., a pulse that is long enough for each set of pairwise elements to receive), or, alternatively, multiple pulses may be transmitted.

In yet another embodiment, the transducer arrays may include more than three transducer elements. For example, FIGS. 11A-11B shows an embodiment of the transducer arrays 92 having four transducer elements 94, 96, 98, 100 positioned in mounting slots formed by an absorption material 102. The array 92 may further include shielding 104 as detailed herein. Each of the transducer elements 94, 96, 98, 100 may also be positioned a predetermined distance from each other. In some embodiments, the distance between elements may differ. For example, in the embodiment shown in FIG. 10, the two left-most elements 94, 96 may be positioned 0.6 mm (~0.0236 inches) apart, and the right-most elements 98, 100 are positioned 0.6 mm (~0.0236 inches) apart. The center two elements 96, 98 may be positioned 1.63 mm (~0.06417 inches) apart, 1.83 mm (~0.0720 inches) apart, or another predetermined distance apart. In some alternative embodiments, the elements may be evenly spaced. In some embodiments, each of the transducer elements 94, 96, 98, 100, may be approximately 1.5 mm (~0.05906 inches) wide. Alternatively, some elements may differ in size (e.g., as detailed above with respect to FIG. 10).

Turning to FIG. 11A, in some embodiments, the four elements 94, 96, 98, 100 may be used in a pairwise fashion as described above. Returns from each of the possible pairs, including the first 94 and second 96 elements, the first 94 and third 98 elements, the first 94 and fourth 100 elements, the second 96 and third 98 elements, the second 96 and fourth 100 elements, and the third 98 and fourth 100 elements, may be spaced at predetermined distances d4, d5, d6, d7, d8, d9 and individually used in a manner similar to the two and three element embodiments detailed herein. Any number of additional elements (e.g., fifth, sixth, seventh, eighth, ninth, or tenth elements) may be utilized in the transducer array 92 in the same manner as detailed herein.

Turning to FIG. 11B, in some embodiments, two or more transducer elements may be electrically connected in parallel to act as a single element. For example, the right-most elements 98, 100 may be connected in parallel to act as a single element in a similar manner to the right-most element 86 of FIG. 10. In such embodiments, the combination of elements 98 and 100 may be referred to as a single transducer element. With continued reference to FIG. 11B, the predetermined distances d10, d11, d12 may be arranged as if the electrically connected elements were a single element (e.g., with an effective predetermined distance d12 to the center of the multiple elements 98, 100). Also, as detailed above, any of the transducer elements described herein (e.g., transducer elements 94, 96, 98, 100 shown in FIGS. 11A-11B) may comprise multiple, electrically connected elements, either directly abutting or spaced, configured to act as a single transducer element.

In some embodiments, the electrically coupled transducer elements (e.g., elements 98, 100 of the transducer array 92) may be configured to transmit sonar pulses into the water. The spacing between the electrically coupled elements may be correlated to the width of the transmitted beam (e.g., a wider spacing may produce a narrower beam), which may allow the transmitted sonar pulses to be precisely designed to match the receive angle of the transducer elements. As detailed below, each of the possible array pairs may have a size of receive beam that depends upon the predetermined distance between the elements in the pair. In some embodiments, the smaller the predetermined distance (e.g., the closer the pair of elements are in each sub-array), the wider the receive beam. For example, the narrowest pair of transducer elements (e.g., elements 94, 96 of the array 92 of FIG. 11B), sometimes referred to as a "coarse" array, may have a wider receive beam than the widest pair of transducer elements (e.g., elements 94 and the combined element 98, 100 of the array 92 of FIG. 11B). In such embodiments, the transmitting transducer (e.g., any of the individual or combined transducer elements 94, 96, 98, 100 of the transducer array or a separate transducer element 50) may be configured to ensonify a region of the underwater environment that causes sonar returns to be received within the receive beam of the coarse array transducers. For example, in an embodiment using the dual crystal transmit transducers 98, 100, the distance between the transducers may be configured to produce a beam from the emitting surface of the transmit transducers that has an angle of approximately ±48 degrees.

FIG. 12 depicts an embodiment of a transducer assembly 75 having two transducer arrays 92 with four transducer elements 94, 96, 98, 100. As detailed above, each of the transducer arrays 92 may receive sonar returns from a respective side of the housing 58 to generate a 3D image of the underwater environment. In some embodiments, the emitting surface of each transducer array 92 may be angled with respect to the surface of the body of water. In some embodiments the emitting surface may be disposed at 30 degrees relative to the surface of the body of water.

With reference to FIG. 13, some embodiments of the transducer arrays 92' may be curved in shape. Such embodiments may be configured to receive a wider range of sonar returns than a linear array (e.g., as shown in FIG. 12) but may otherwise operate in the same manner. In such embodiments, the angle of the emitting surface of the transducer arrays 92' may change along the width of the transducer array.

With reference to FIG. 14, an embodiment of a transducer assembly is shown having circuitry 124 (e.g., a sonar signal processor and/or transceiver) positioned in the housing 58. As detailed above, the transducer arrays 92 may be substantially rectangular in shape and extend longitudinally through the housing 58. In some embodiments, a shielding 126 may form a framework to hold the transducer arrays 92 and the downscan transducer 50 in a predetermined orientation with respect to each other and the housing 58. In this manner, the transducer elements 94, 96, 98, 100 may be positioned relative to one another and/or relative to the remaining transducers in the housing 58 by defining the mounting slots at a predetermined position in the absorptive material 102 in the shielding framework 126 and inserting the transducer elements into the mounting slots of the absorptive material. In such embodiments, the absorptive material 102 may define channels in which the transducer elements 94, 96, 98, 100 are positioned. The absorptive material 102 may enclose the transducer elements 94, 96, 98, 100 on three longitudinal sides and/or on opposite ends, such that one or more emitting surfaces are exposed. As detailed herein, the shielding and/or absorptive material may be removed from one or more sides to increase the transmitting and/or receiving beam width of a transducer element.

FIG. 15 depicts an embodiment of the present invention in which the downscan transducer 50 transmits sonar pulses for receipt by the sidescan transducer arrays 92 during interferometric imaging. In some embodiments, the downscan transducer may transmit sonar pulses downwardly and outwardly in a fan-shaped beam from one or more emitting surfaces 50b, 50c, 50d (e.g., as shown in FIGS. 5A, 5B). The sonar pulses may echo from one or more surfaces in the water (e.g., the floor of the body of water, fish, or other reflective surfaces) and return to one or both transducer arrays 92. For example, in the embodiment shown in FIG. 15, the downscan transducer transmits sonar pulses, which may be received as returns by both arrays 92.

With continuing reference to FIG. 15, in some embodiments, the downscan transducer may include a shielding 106 and or sound absorption material 108 positioned on one or more sides 50a, 50b, 50c, 50d of the downscan transducer element 50. Each surface 50a, 50b, 50c, 50d of the transducer element 50 may be configured to transmit fan-shaped sonar beams. In the depicted embodiment, the downscan transducer element 50 is now configured to transmit sonar pulses in the form of a fan-shaped beam from the bottom surface 50c and the opposing side surfaces 50b, 50d without transmitting sonar pulses from the top surface 50a. Thus, the first transducer element 50 is configured to emit a fan-shaped beam of sonar pulses in a direction substantially perpendicular to the surface of the water (e.g., beam 110c), as well as in opposite directions that are substantially parallel to the surface of the water (e.g., beams 110b, 110d). This provides a wider coverage of sonar pulses and, may provide a similar coverage of sonar pulses as the transducer assembly 75 of FIGS. 6, 12, and 13. Along these same lines, the beams 110b, 110c, 110d shown in FIG. 15 are conceptual in nature. Therefore, while gaps are shown in between each of the beams 110b, 110c, 110d, in some embodiments, the downscan transducer element 50 may not include gaps when transmitting sonar pulses and, thus, full coverage below and to the sides of the first transducer element 66 is obtained. For example, the beams 110b, 110c, 110d may provide substantially continuous sonar coverage from one side of a vessel to an opposite side of the vessel to provide sonar returns to each transducer array.

While the downscan transducer element 50 shown in FIG. 15 is a linear transducer element that produces fan-shaped sonar beams, other shaped transducer elements can be used (e.g., oval, elliptical, tapered patterned array, amplitude tapered array, etc.).

In some alternative embodiments, the sidescan transducer arrays may transmit and receive sonar pulses for interferometry. For example, with reference to FIG. 16, the sidescan transducer arrays 112 may transmit sonar pulses from one or more sidescan transducer elements and receive sonar returns from the transmitted pulses. Each transducer array 112 may transmit sonar pulses in a fan-shaped beam 122 on its respective side of the housing 58 to generate sonar returns from the reflected sonar pulses. The fan-shaped beam may be transmitted by any of the transducer elements 114, 116, 118, 120. In some embodiments, the lowest transducer element 120 may transmit the fan-shaped beam 122. In some embodiments, two transducer elements (e.g., elements 118 and 120 in FIG. 16) may be electrically connected in parallel to act as one transducer element, as described herein. In such embodiments, the coupled elements 118, 120 may combine to transmit the fan-shaped beam. FIG. 16 illustrates a simplified approximation of the two electrically coupled elements 118, 120 transmitting sonar pulses 122 from a position approximately between the elements; however in practice the beam 122 may originate as two separate beams from both elements that overlap to form a single beam. As detailed above, the dual crystal transmit transducer 118, 120 may control the width of the transmitted beam by adjusting the distance between the elements. Similarly, embodiments of the transducer arrays with one, two, three, or greater than four transducer elements may also transmit sonar pulses.

With continued reference to FIG. 16, after the sonar pulses are transmitted by the transducer element(s), one or more of the sidescan transducer elements 114, 116, 118, 120 may receive the corresponding sonar returns. In some embodiments, each of the elements may receive the sonar returns and perform interferometry as detailed herein, for example, with respect to FIGS. 6 and 10-13. In other embodiments, a subset of the transducer elements 114, 116, 118, 120 may receive the sonar returns. For example, the elements not transmitting sonar pulses may receive the returns, such that each transducer element is either a transmit-only or receive-only element. In other embodiments the transmitting transducer(s) may also be configured to receive the corresponding sonar returns. In some embodiments, the transducer arrays 112 may operate in a similar manner as described in other embodiments of the transducer arrays herein.

Downscan Interferometry

In some embodiments, the downscan transducer element 50 (shown in FIG. 15) may be replaced with a downscan transducer array 47 as shown in FIG. 17. The downscan transducer array 47 may include the same structure and function as described herein with respect to the sidescan transducer arrays (e.g., sidescan transducer array 92 shown in FIG. 15) with the exception of the orientation of the array.

Embodiments of the downscan transducer array 47 may include two or more downscan transducer elements 294, 296, 298, 300 configured to transmit downscan sonar pulses and/or receive downscan sonar returns. Similar to the sidescan transducer array 92, the downscan transducer array 47 may transmit sonar pulses with one or more downscan transducer elements 294, 296, 298, 300 and receive sonar returns with two or more downscan transducer elements

294, 296, 298, 300 to interferometrically determine the position of the point of origin of the sonar returns.

In some embodiments, at least one of the two center downscan transducer elements 296, 298 may be configured to transmit the downscan sonar pulses. Alternatively, at least one of the other downscan transducer elements 294, 300 may be configured to transmit the downscan sonar pulses. In some embodiments, as detailed above with respect to the sidescan transducer arrays, two or more of the downscan transducer elements 294, 296, 298, 300 may be electrically coupled in parallel to act as a single element. For example, the left two 294, 296, the center two 296, 298, or the right two 298, 300 downscan transducer elements may be electrically coupled in parallel to transmit and/or receive as a single element.

Also, as detailed above with respect to the sidescan transducer arrays, the downscan transducer elements may receive downscan sonar returns with more than one element to interferometrically determine the angle to the point of origin of the sonar returns. In some embodiments, the receiving downscan transducer elements may operate in a pairwise fashion to produce more robust return data. Each of the respective pairs (e.g., the first 294 and second 296 transducer elements, the first 294 and third 298 transducer elements, the first 294 and fourth 300 transducer elements, the second 296 and third 298 transducer elements, the second 296 and fourth 300 transducer elements, and the third 298 and fourth 300 transducer elements) may be used to generate a set of downscan return data. In some further embodiments, a subset of the downscan transducer elements 294, 296, 298, 300 may be used to generate the downscan return data. For example, in some embodiments, each of the transducer elements 294, 296, 298, 300 may be configured to either transmit only or receive only.

In some embodiments the downscan transducer array 47 may be used alone in the housing 58 with no sidescan transducer arrays 92 as shown in FIG. 18. In such embodiments, the 3D mesh data may be formed from the interferometric data generated by the downscan transducer array. In some alternative embodiments, both a downscan transducer array 47 and one or more sidescan transducer arrays 92 may be used to generate 3D mesh data. In such embodiments, each array may independently transmit sonar pulses and receive sonar returns as described herein, or, alternatively, one or more of the transducer arrays (e.g., the downscan transducer array 47) may transmit sonar pulses and receive sonar returns and the remaining transducer arrays may receive only. In some further embodiments, the downscan transducer 47 array may transmit only. The downscan transducer array 47 may be straight in a widthwise direction such that all of the emitting surfaces of the transducer elements 294, 296, 298, 300 are substantially coplanar (e.g., as detailed above with respect to the sidescan transducer array 92 of FIG. 12) or alternatively, the downscan transducer array 47 may be curved (e.g., as shown with respect to the sidescan transducer array 92' of FIG. 13).

In some embodiments, the downscan transducer array 47 may be replaced by angling the sidescan transducer arrays 92 lower from the horizon. For example, the sidescan transducer arrays may be positioned at 45 degrees relative to the surface of the body of water. In yet some further embodiments, the downscan transducer array 47 may be joined with the sidescan transducer arrays 92 within a single shielding to define a continuous array of transducer elements about the perimeter of the housing 58. In such embodiments, the combined transducer array may be curved (e.g., in the same manner as detailed herein with respect to a single transducer array) or may have angled sections in substantially the same positions as the sidescan transducer arrays 92.

In some embodiments, the downscan transducer array 47 may include a shielding 302 and/or absorption material 304 defining mounting slots for positioning and isolating the elements 294, 296, 298, 300. In some alternative embodiments, the shielding 302 and/or absorption material 304 may be removed from the side surfaces of the downscan transducer array 47 as shown with respect to the downscan transducer element 50 of FIG. 15.

In some embodiments, with reference to FIG. 19, the transducer assembly including one or more of a downscan transducer array and sidescan transducer array, may be angled forward such that the beam is transmitted at least partially forward relative to the direction of travel of the boat. For example, FIG. 19 shows a transducer assembly 305 angled forward from a direction perpendicular to the surface of the body of water, such that the beam may be angled at least partially forward relative to the boat. The transducer assembly 305 may comprise any of the transducer assembly embodiments detailed herein and may include a housing 310 and at least one transducer array 315. In the embodiment of FIG. 19, the transducer array may include two or more linear transducer elements that transmit a fan-shaped beam. The fan-shaped beam may have a long edge perpendicular to the direction of travel of the boat (e.g., such that a length of the transducer elements is oriented along the keel of the vessel similar to FIGS. 5A and 5B). In some other embodiments, the transducer elements of the one or more transducer arrays may be oriented perpendicular to the direction of travel, such that the fan-shaped beam is produced along a plane defined vertically from the centerline of the boat. In some further embodiments, other beam shapes (e.g., conical shaped, elliptical shaped, multiple conical shaped, etc.) may be used. Additional examples of transducer array orientations, configurations, processing, and other information may be found in U.S. patent application Ser. No. 14/618,987 filed Feb. 10, 2015, and entitled "A Transducer Array having a Transciever," which reference is hereby incorporated by reference herein in its entirety.

Example Interferometric Processing and 3D Imaging

The following describes various example embodiments for transforming and rendering raw sonar data in different contexts, which may be performed by the sonar systems 30, through the configuration of the sonar module 44. It is understood that the sonar systems 30 described herein are merely examples of computing systems that may be configured to perform the various functionalities. For example, computing systems that are not configured for mounting to a watercraft and do not have interfaces to sonar transducer elements may be configured to perform at least some of the functionality described herein. Additionally, it will be apparent to one of skill in the art that the following described functionalities may be performed together in a unified manner or as separate, independent functions where appropriate.

As detailed herein, embodiments of the transducer assembly may be configured to receive sonar returns from substantially the same area of the underwater environment using two or more transducer elements. The two or more transducer elements may determine a position of the received returns by comparing the respective returns received at each element. While some embodiments illustrate outputs with respect to one type of transducer array (e.g., sidescan transducer arrays), any type of array (e.g., downscan transducer arrays or sidescan transducer arrays) may produce similar results unless otherwise indicated.

Each of the pair-wise array combinations may be defined by the predetermined distance between the respective transducer elements. The acoustic receive sensitivity of each sub-array may vary depending on the predetermined distances between the elements of each array combination. As detailed above, the phase shift with respect to incident angle is related to the predetermined distance between the elements as rewritten in Equation (2):

$$\frac{2\pi}{\lambda} d \sin(\beta) = \theta \quad (2)$$

Accordingly, the phase shift may vary with incident angle more rapidly for larger d. In some embodiments, a transducer array having multiple transducer elements may arrange the elements according to the nonredundant spacing techniques described herein in order to stagger the precision and noise of each sub-array to produce a more robust transducer array. In particular, a "coarse" array may have the smallest predetermined distance d (e.g., the predetermined distance d10 between the leftmost elements 94, 96 of FIG. 11B) and thus may be the least sensitive to changes in incident angle. A "medium" array may have a predetermined distance d (e.g., the predetermined distance d11 between the combined right element 98, 100 and the center element 96 of FIG. 11B) that is slightly larger and thus more sensitive to changes in angle. Finally, a "fine" array may have the largest predetermined distance d (e.g., the predetermined distance d12 between the outer two elements 94 and 98, 100) and is thus most sensitive to changes in incident angle.

In the "coarse" array, the pair of elements may receive the least ambiguous data but may also generate the least precise data of the pairwise sub-arrays (e.g., least sensitive to changes in angle). In the "fine" array, the pair of elements may receive somewhat more ambiguous data, but may also generate the most precise data (e.g., most sensitive to changes in angle). In some embodiments, the coarse array produces less ambiguous data because phase wrapping may not occur within a desired range of angles that are ensonified, while the fine array may be more ambiguous because the phase may wrap within the ensonified area. In such embodiments, the coarse array may at least partially resolve the data from the fine array within a specific region, and a single solution may thereby be determined for the fine array.

In some alternative embodiments, each of four transducer elements (e.g., the four sidescan transducer elements 94, 96, 98, 100 shown in FIG. 11A or the four downscan transducer elements 294, 296, 298, 300 shown in FIG. 17) detailed above may be used in a pairwise fashion to generate up to six sets of return data. Similarly, nonredundant or redundant spacing may be used for any combination of two or more elements disclosed herein. For example, in some embodiments, three individual transducer elements may be used in the same manner as detailed above. Some embodiments may use two transducer elements in a transducer array as to generate a single set of interferometric return data. Moreover, some embodiments may automatically or manually allow a user to select a subset of available transducers to receive return data.

In embodiments that generate more than one set of interferometric return data (e.g., the "coarse," "medium," and "fine" arrays of FIG. 11B), the sets of return data may be correlated in a variety of ways to generate a final set of interferometric return data. In some embodiments, the sets of interferometric return data may be correlated by comparing the sets of data. For example, if three sets of data are used, the sonar signal processor may remove points of return data from one of the sets that substantially differ from the other two (e.g., to eliminate noise). When comparing two or more sets of data, two points that differ substantially between sets may both be removed. In some embodiments, multiple sets of interferometric return data may be correlated (e.g., compared, combined, among others) to generate a more robust set of return data with more data points.

In some embodiments, the results of each set of data may be averaged to produce a final result. For example, the angle determined to a given point by a first set of interferometric return data (e.g., a coarse array) may be averaged with the angle to the same point determined by a second set of interferometric return data (e.g., a fine array) to generate a final angle value. Similarly the distance, time, strength, phase, or component coordinate values may be averaged. In such embodiments, averaging the returns from each of the pairwise arrays may eliminate noise while also generating more precise return data. In some embodiments, weighting can be used for correlating the sets of data to product the final result (e.g., the fine array may be weighted differently than the coarse array).

As discussed herein, the transmitting transducer (e.g., the downscan transducer or one or more of the sidescan transducer elements) may transmit a sonar pulses downwardly and outwardly from the boat, and a plurality of sidescan transducers may receive the corresponding sonar returns in a pairwise fashion to generate interferometric sonar return data. In some embodiments, the interferometric return data may be received from two-dimensional slices of the underwater environment (e.g., the fan-shaped beams have narrow width in the direction of travel of the watercraft—thereby forming thin slices of a raw sonar data of the underwater environment). In this regard, each sonar return of the raw sonar data may be defined by, at least, a distance and an angle (e.g., 2D), which may be processed (e.g., by the sonar signal processor 32 of FIG. 2) to generate 2D sonar data. Further, even though there may be some space within the narrow width of the fan-shaped beam, the 2D sonar returns can be defined to ignore that width and, thus, be assumed to be 2D. The 2D sonar data may be substantially two dimensional sets of data oriented perpendicular to the direction of travel of the boat (e.g., parallel to the plane of the fan-shaped beam). With reference to FIG. 20, the 2D sonar data may be formed as 2D point clouds with a plurality of points representing the returns from a reflecting surface of the body of water (e.g., fish, sea floor, etc.). FIG. 20 illustrates a simplified illustration of a 2D sonar data derived from raw sonar data in accordance with an embodiment of the present invention. The 2D sonar data may represent a plurality of points representing individual, or groups of, points 310 from the 2D slice of the underwater environment from which sonar return data is received. For example, the points 310 may represent returns from the floor of the body of water 14 or from other objects from which the sonar pulses echo. For example, FIG. 20 depicts a fish 314 in the water column and an object 312 resting on the floor 14 of the body of water. In some embodiments, the sonar return data from the 2D slice are saved in memory for processing to form the 3D mesh data, which may be displayed as a 3D image. In some embodiments 3D image data representing a 3D image may be stored in a buffer prior to or in conjunction with display on the screen.

The 2D sonar data may comprise data from two or more transducer arrays (e.g., the sidescan and/or downscan transducer arrays). For example, in some embodiments, a left or first sidescan transducer array may capture interferometric sonar returns from a portion of a 2D slice on a left side of the boat and a right or second sidescan transducer array may capture interferometric sonar returns from a portion of a 2D slice an opposite or right side of the boat. In such embodiments, the 2D sonar data may be defined by joining the raw returns from the first and second sidescan transducer arrays to form a single data set. In some embodiments the returns from the first and second sidescan transducer arrays may be joined at an axis representing the line of travel of the boat. In some embodiments, raw return data from the downscan transducer array may be used alone or in combination with one or more sidescan transducer arrays to produce 2D sonar data.

In some embodiments, each set of sonar returns (corresponding to a set of sonar pulses) as the watercraft travels may generate a single slice of 2D sonar data. The plurality of sets of 2D sonar data (built up as the watercraft travels) may be processed together and used to generate 3D mesh data.

In some embodiments, the 3D mesh data may be produced by combining the points of interferometric return data from each set of 2D sonar data onto a 3D grid to create a 3D point cloud of individual data points. The 3D point cloud may then be processed (e.g., using the sonar signal processor 32) to generate a mesh based on the overall topography of the point cloud.

In some embodiments, 2D sonar data may be processed with one or more adjacent sets of 2D sonar data to produce an adjusted set of sonar data. The adjusted set of sonar data may include interpolated connections between the points of 2D sonar data and/or between adjacent sets of 2D sonar data to visualize the 2D slices of the underwater environment. The adjusted set of sonar data may represent continuous contours or topographical meshes such that the 3D mesh data may be formed by connecting the adjusted sets of sonar data with connecting gridlines 320, as shown in FIG. 21.

2D sonar data or adjusted 2D sonar data may be grouped and processed into sub-combinations or subsets of data before generating final 3D mesh data. In some embodiments, the 3D mesh data may be stored or displayed in multiple, smaller segments that connect with one another, rather than using a single, large set of 3D mesh data. For example, after a predetermined number of sets of 2D sonar data or after a predetermined memory limit, the 3D mesh data may separate and begin a new segment of 3D mesh data. Additionally or alternatively, separate 3D mesh data may be stored for each array, such that two parallel meshes (e.g., one on either side of the vessel) are plotted together in the 3D image. In some further embodiments, additional or fewer processing steps may be required to convert the raw sonar data into 3D mesh data, and the present disclosure envisions any means of converting raw sonar return data into 3D mesh data. U.S. Patent Application Ser. No. 62/128,641, filed Mar. 5, 2015, entitled "Reconstruction of Underwater Features for 3D Imaging" provides additional detail regarding example systems and methods of reconstructing a 3D Image and is hereby incorporated by reference herein in its entirety.

In some embodiments, each of the sets of 2D sonar data may be displayed on a display, such as the display 40, by adding the newest 2D slice onto the front of the previous set of sonar data. The interferometric data in each set of 2D sonar data may be processed into the 3D mesh data and displayed as the 3D image. With reference to FIG. 21, the 3D mesh data may represent a topographical grid showing the contour of the floor of the body of water.

The 3D image may be represented as a waterfall view, wherein each set of adjusted sonar data (e.g., corresponding to a 2D slice of the underwater environment) is displayed in order, ultimately building up as the boat travels to form the 3D image. In some embodiments, the 3D image may be displayed in a perspective view (e.g., as shown in FIGS. 1, 21, and 22) such that the contour of the floor of the body of water is visualized in three dimensions.

As shown in FIG. 21, the 3D image may also be turned with the movement of the boat such that the gridlines appear to turn as shown in FIG. 21. Alternatively, the mesh may be formed in an absolute grid centered around a global coordinate system (e.g., north, south, east, west) and the mesh may fill in perpendicularly each time. In some embodiments, the 3D image may be displayed as a waterfall of 2D sonar data or adjusted sets of sonar data, regardless of the movement of the boat. In other embodiments, the 2D sonar data or adjusted sets of sonar data may be turned and oriented relative to the direction and movement of the boat. In yet some further embodiments, the 2D sonar data or adjusted sets of sonar data may be oriented and scaled according to their actual position in the body of water.

With continued reference to FIG. 22, a simplified view of the 3D image is shown having the gridlines 320 arranged in a perspective view to show the three dimensional path of the boat along the bottom of the body of water. The path of the boat may be defined by a centerline 322 of the grid. As such, in embodiments where a sidescan transducer array is used (e.g., the sidescan transducer array 92 of FIG. 12), area to the left 324 of the centerline 322 may be produced by a port sidescan transducer array, and the area to the right 326 of the centerline 322 may be produced by a starboard sidescan transducer array. In embodiments where a downscan transducer array is used (e.g., the downscan transducer array 47 of FIG. 17) the entire 3D mesh data, or a middle portion thereof, spanning the centerline 322, may be defined by the downscan transducer array. As detailed above, the returns from the various arrays may not necessarily about each other directly on the centerline 322, as such, the results may be combined or partitioned to define the 3D mesh data.

The 3D mesh data may further show terrain features on the bottom of the body of water. For example, a hump 328 is shown in the 3D image of the 3D mesh data representing a raised plateau on the bottom of the body of water. In some embodiments, the gridlines 320 may represent squares of connected data points. In some alternative embodiments, the surface may be reconstructed as triangles in order to resolve the surface contour.

In some embodiments and as shown in FIGS. 21-22, the adjusted sets of sonar data may be rendered and plotted by the sonar system in conjunction with positioning information (e.g., GPS, inertial sensors, dead reckoning positioning, etc.). The positioning information may define a relative movement between slices, which is then used to adjust the position of the sonar data on the display 40 relative to the previous set of sonar data. For example, the 3D image of FIG. 21 turns as the boat changes its direction of travel. In some further embodiments, the positioning information may define an actual geographic position, such that the location and orientation of the sonar data represent an absolute position from which the slice was sounded. In such embodiments, the device may be scaled and oriented onto a chart, to represent a 3D image of the reflected surfaces in the body of water at the same position on the chart.

In some embodiments, the 3D data may also include objects in the water column, such as the fish 330 shown in FIG. 22. In some alternative embodiments, separate 3D data may be generated for objects in the water column (e.g., the vessel, fish, obstacles, etc.)

With reference to FIG. 29, a flow diagram illustrating an embodiment of the interferometric process is shown. In some embodiments, the sonar system may transmit sonar pulses with a transmit transducer 4400 (e.g., a downscan transducer element 50, 294, 296, 298, 300 or a sidescan transducer element 94, 96, 98, 100). One of the transducer elements in a transducer array may receive first sonar returns from the transmitted sonar pulses 4405, and a second transducer element in the array may receive second sonar returns 4410. The first and second sonar return data may be processed to generate a 3D Mesh Data 4415 as detailed herein. In some embodiments, a display (e.g., the display 40 shown in FIG. 2) may display the 3D image 4420.

In some further embodiments, with reference to FIG. 30, a third transducer element may be used. For example, a transmit transducer (e.g., a downscan transducer element 50, 294, 296, 298, 300 or a sidescan transducer element 94, 96, 98, 100) may transmit a sonar pulse into a body of water 4500. First, second, and third transducer elements may receive first, second, and third sonar return data respectively 4505, 4510, 4515. The sonar system may process the first and second sonar returns to generate a first set of 2D sonar return data 4520. Similarly, the sonar system may process the first and third sonar return data to generate a second set of 2D sonar return data 4525. The sonar system may then generate a third set of 2D sonar return data based on a comparison of the first and second sets of 2D sonar return data 4530. The sonar system may then generate a 3D mesh data based on the third set of 2D sonar data 4535. In some embodiments, a display (e.g., the display 40 shown in FIG. 2) may then display a 3D image based on the 3D mesh data.

In some embodiments, the 3D mesh data detailed above may be further processed (e.g., by the sonar signal processor 32) to generate a more complex 3D image. The 3D mesh data may be processed to represent a smoother image that may give the user an intuitive understanding of the features of the bottom of the body of water. In some embodiments, the sonar system may apply textures or surfaces to the 3D mesh data to indicate the contour, density, depth, or any other characteristic of the imaged surfaces. For example FIG. 22 depicts a smoothed 3D image to depict smoother, more natural contours.

Example Application of Sidescan Imaging

In some embodiments, the embodiments of the sidescan transducer arrays (e.g., sidescan transducer arrays 46, 48, 80, and 92), may additionally or alternatively be used for sidescan imaging. Sidescan imaging may be generated by transmitting sidescan sonar pulses with at least one element of a sidescan transducer array and receiving sidescan sonar returns with at least one element of a sidescan transducer array. With reference to the embodiment of FIG. 6, at least one of the sidescan transducer elements of each array may be configured to transmit sonar pulses which echo from objects in the underwater environment (e.g., the floor of the body of water, fish, objects, etc.) in a manner similar to the above-described embodiments. In some embodiments, the transmitted sonar pulses from a sidescan sonar element will define a fan-shaped beam on one side of the boat (e.g., as shown in FIGS. 5A and 5B). At least one sidescan transducer element may then receive the sonar returns to generate sidescan sonar image data. Additional examples of sidescan sonar imaging systems and methods are shown and described in U.S. Patent Publication No. 2013/0148471, filed Dec. 7, 2011, and entitled "Sonar Rendering Systems and Associated Methods," and U.S. Patent Publication No. 2013/0208568, filed Feb. 10, 2012, and entitled "Sonar Assembly for Reduced Interference," both of which are hereby incorporated by reference in their entireties.

For example, in the embodiment shown in FIG. 6, the lowermost sidescan transducer element 62 may be configured to transmit sonar pulses and the uppermost sidescan transducer element may be configured to receive sonar pulses. The returns may then be plotted to show the time/distance of the sonar returns from the watercraft to the left and right as the watercraft travels (e.g. upwardly). An example sidescan image is shown in FIG. 23. In some other embodiments, the uppermost sidescan transducer element 60 may be configured to transmit-only for sidescan imaging and the lowermost sidescan transducer element 62 may be configured to receive-only. In some embodiments, either or both of the lowermost transducer element 62 and the uppermost transducer element 60 may be configured to transmit and receive sonar pulses. As detailed above, any one or more of the sidescan transducer elements may operate in a transmit-only, receive-only, transmit/receive, or inactive capacity for sidescan imaging.

Also similar to the displayed 3D image detailed above, each sonar column may be associated with a scan or beam emission performed by the transducer or a transducer array at a particular time. Based on a scan rate that may be controlled by processing circuitry of a sonar system, new sonar columns may be generated and prepared for display. Each sonar column may also be associated, by the processing circuitry, to a geo-location at the sonar column's center point. The geo-location of the sonar column may be determined based on the location of the watercraft at the time when the sonar column data was captured as indicated by the position sensing circuitry. The sonar column may also be time-stamped or given a sequence number that may be used to determine the ordering of the sonar columns.

In some embodiments, the sonar system of the present invention may be configured to simultaneously carry out 3D mesh data generation (via interferometry) and sidescan sonar imaging. In these embodiments, the sidescan sonar images may either be taken simultaneous with or in rapid succession with the interferometric 2D sonar data. For example, the transmit transducer of the interferometric system (e.g., either one of the sidescan transducer elements or a downscan transducer) may transmit at the same time as a sidescan transducer element for sidescan imaging. In some other embodiments, the sidescan transducer array may transmit sidescan sonar pulses in alternating fashion, or in a series of alternating bursts (e.g., 3 pulses of sidescan transmissions and 3 pulses of interferometric pulses). In each of these embodiments, the receiving elements for either the sidescan imaging or interferometric imaging may be electrified in the same sequence in order to receive their respective returns.

In some embodiments, one sidescan transducer element may be configured to transmit interferometric sonar pulses, while a second sidescan transducer element in the same array may be configured to transmit sidescan sonar pulses. In some embodiments, the same element may transmit for both sidescan and interferometric imaging. In these embodiments, one or more elements may transmit a fan-shaped beam, which may be received by a plurality of sidescan transducer elements for simultaneously generating 3D mesh data and sidescan image data.

In some embodiments, the interferometric and sidescan imaging processes may use different frequencies to allow the transducer elements and sonar signal processor to distinguish between the respective returns. For example, the downscan transducer (or interferometrically transmitting sidescan transducer element) may transmit the interferometric sonar pulses at 600 kHz, and the sidescan transducer element may transmit the sidescan imaging sonar pulses at 480 kHz. One or more of the sidescan transducer elements may be configured to receive both frequencies of sonar pulses, depending on the electrification of the element at a given time. In such an embodiment, the interferometric imaging and sidescan imaging may be performed as described above with the sonar signal processor and transducer elements automatically sorting between interferometric returns and sidescan returns.

In some embodiments, the sonar system may generate a sidescan sonar image in addition to the 3D mesh data as detailed above. In such embodiments, the sonar system (e.g., via the sonar signal processor 32) may combine the sidescan sonar image with the 3D mesh data to generate the 3D image. The 3D mesh data may represent a 3D visualization of the floor (or other detected features) of the bottom of the body of water, as detailed above. In some embodiments, combining the sidescan sonar image data with the 3D mesh data may comprise overlaying the sidescan sonar image data onto the topographical features of the 3D mesh data to create the appearance of a picture of the bottom of the body of water as shown in FIG. 26. FIG. 26 depicts a simplified version of the overlaid sidescan image taken in large sections with the water column still included for illustration purposes. The 2D segments of the sidescan image may be significantly narrower such that the sidescan image smoothly lies atop a shifting 3D mesh data.

To overlay the sidescan sonar image data onto the 3D mesh data, the water column (e.g., 405 in FIGS. 23-24) may be removed and the remaining sidescan image may be combined to generate a continuous image of the bottom of the body of water. The sidescan image may then be draped onto the 3D mesh data to translate the topographical contours of the 3D mesh data onto their corresponding location in the sidescan image as shown in FIG. 26. In some embodiments, the 3D mesh data and/or the sidescan image data may be scaled relative to one another such that the respective positions align. In some embodiments, the sidescan sonar image may be stretched so that the outer extents of the sidescan sonar image align with the extent of the 3D mesh data in the 3D image. In some embodiments, the sonar signal processor (e.g., the sonar signal processor 32) may match one or more features on the sidescan image data with corresponding topographical features on the 3D mesh data and scale the remainder of the sidescan image accordingly. For example, brighter pixels in the sidescan image (e.g., as shown in FIG. 23) may represent protruding features from the floor of the body of water. These features may be aligned with high points near the same location on the 3D mesh data to scale the sidescan image to size.

The sidescan sonar returns may be simultaneously or sequentially generated with the interferometric data, as detailed above. In such embodiments, the sonar system may combine the two images automatically as they are generated. In some alternative embodiments, the sonar system may correlate a time or position data associated with the sidescan and 3D mesh data to combine them. The images may be combined even when taken at different times. For example, in some embodiments, a 3D mesh data may be generated by passing over an area of the body of water in the boat. In a second pass, a sidescan image may be generated. The sidescan image may be oriented, scaled, and combined with the 3D mesh data in the 3D image based on their respective positions and features regardless of the time at which they were taken.

With reference to FIG. 31, the interferometric portion of the sonar system may transmit sonar pulses into a body of water using a transmit transducer 4600 as detailed in the various embodiments herein. The transmitted sonar pulses may be received by a first transducer element 4605 (e.g., the sidescan transducer elements 94, 96, 98, 100 or downscan transducer elements 294, 296, 298, 300). The transmitted sonar pulses may also be received by a second transducer element 4610 (e.g., the sidescan transducer elements 94, 96, 98, 100 or downscan transducer elements 294, 296, 298, 300). Simultaneously or sequentially with obtaining the interferometric data, the first or second sidescan transducer element may transmit sidescan sonar pulses 4615, as detailed herein. At least one of the first or second sidescan transducer elements may receive sidescan sonar returns 4620. The sonar system may generate 3D mesh data based on the interferometric data and spacing between the transducer elements 4625. The sonar system may further generate 3D image data, representing the 3D image, based on the 3D mesh data and sidescan sonar return data 4630. In some embodiments, a display (e.g., the display 40 shown in FIG. 2) may display the 3D image 4635.

Downscan Imaging

Some embodiments of the transducer arrays (e.g., transducer arrays 46, 47, 48, 80, and 92), may additionally or alternatively be used for downscan imaging. Downscan imaging may be generated by transmitting and receiving downscan sonar pulses with the downscan transducer element. With reference to the embodiment of FIG. 6, the downscan transducer element 50 may be configured to transmit sonar pulses which echo from the reflecting surfaces in the body of water (e.g., the floor of the body of water, fish, obstacles, etc.) in a manner similar to the above-described embodiments. In some embodiments, the downscan transducer element 50 may be a linear downscan transducer, such that the downscan transducer element is configured to transmit a fan-shaped beam. Alternatively, a downscan transducer array 47 (shown in FIG. 17) may be used to transmit downscan sonar pulses and receive downscan sonar returns with one or more downscan transducer elements 294, 296, 298, 300. In the downscan transducer array 47 embodiments, any one or more of the downscan transducer elements 294, 296, 298, 300 may transmit sonar pulses and any one of the elements may receive the respective returns, including using a single element for both or using one element as a transmit-only element and another as a receive-only element. In some other embodiments, a circular downscan transducer may be provided to generate downscan sonar returns. Downscan imaging may be performed in accordance with the apparatus and methods disclosed in U.S. Pat. No. 8,305,840 and U.S. Pat. No. 8,300,499, which references are incorporated herein in their entireties.

Downscan sonar returns may be displayed (e.g., on the display 40) to form a two dimensional plot of return distance of sonar returns as the watercraft travels (e.g., to the right in FIG. 25). FIG. 25 shows on the right side (e.g., right display portion 130), an exemplary screen shot of a circular downscan transducer image that corresponds to the display (e.g., the left side of the figure (left display portion 132)) produced by a linear downscan element of an embodiment (e.g., downscan element 50). In this regard, the left display of FIG. 25 shows a boulder on the left, two tree trunks rising up from the bottom near the center of the display, and, possibly, several fish (white spots) near the lower right. The corresponding same features can be determined from the right display 130 (i.e., the circular downscan display). In such an example embodiment, the transducer assembly includes two separate downscan transducers (one linear downscan transducer element and one circular downscan transducer element).

The downscan transducer element 50 or downscan transducer array 47 may be used to generate downscan returns simultaneously, sequentially, or independently of the interferometric returns detailed above. In some embodiments, the downscan transducer 50 or downscan transducer array 47 may transmit a fan-shaped beam for generating the interferometric returns with the sidescan transducer arrays (e.g., 46, 48, 80, 92) and may simultaneously receive the same returns to generate downscan return data. Alternatively, the downscan transducer element 50 or downscan transducer array 47 may sequentially transmit pulses for interferometric and downscan imaging. In some embodiments, the downscan transducer may produce two different frequencies (e.g., 600 and 480) to distinguish between downscan and interferometric pulses. In embodiments in which the sidescan transducer array (e.g., 46, 48, 80, 92) transmits sonar pulses, the sidescan and downscan transducers may alternately or simultaneously transmit pulses, with or without differing frequencies as discussed above. In embodiments of the downscan imaging array 47, one element 294, 296, 298, 300 may transmit sonar pulses for downscan imaging while another element transmits sonar pulses for interferometric imaging. Alternatively, a single element may transmit for both downscan and interferometric imaging.

In some further embodiments, sidescan imaging may be used, as detailed above, in combination with or independent from downscan imaging and interferometric imaging. Moreover, the downscan functionality may be used independently to generate a downscan image.

In some embodiments, the downscan return data (e.g., one-dimensional downscan returns) may additionally or alternatively be combined with the 3D mesh data. For example, in some embodiments, one dimensional downscan sonar returns may be used to apply depth markers to the 3D image along the direction of travel. In some further embodiments, the downscan data may be used to confirm positioning of sonar returns in the 3D mesh data, such as confirming a depth of the sea floor or confirming a depth of fish. In some embodiments in which the downscan transducer array produces the 3D mesh data, additional downscan return data (e.g., one-dimensional downscan returns) may be simultaneously acquired and combined with the 3D mesh data.

The downscan sonar returns may be simultaneously or sequentially generated with the interferometric data (e.g., receiving downscan returns from the same sonar pulses that generate the interferometric data, or alternatively, sequentially transmitting downscan and interferometric sonar pulses). In such embodiments, the sonar system may combine the two images automatically as they are generated. In some alternative embodiments, the sonar system may correlate a time or position data associated with the downscan and 3D mesh data to combine them. The images may be combined even when taken at different times. The downscan image data may be oriented, scaled, and combined with the 3D mesh data based on their respective positions and features regardless of the time at which they were taken.

Data Updating

In some embodiments, preexisting sonar data may be updated or modified with newer sonar data. The sonar data described herein may include 3D mesh data, sidescan image data, downscan image data, and/or 3D image data. With reference to FIG. 32, the sonar system may generate Live 3D Mesh Data 4700 via the systems and process detailed herein. The system may then determine a position associated with the Live 3D Mesh Data 4705, for example, by obtaining GPS or other position data associated with the Live sonar data. The system may then update at least a portion of a Stored 3D Mesh Data 4710 using the Live 3D Mesh Data and based on the position associated with the Live data.

In some embodiments, Stored 3D Mesh Data that was generated previously, either by the sonar system or by another sonar system and stored, may be updated with Live data as the boat travels over the body of water. Similarly, Stored data may be generated from live data in the same manner without necessarily replacing old data. In some embodiments the Stored data may be locally stored on the sonar system (e.g., in the storage module 37 shown in FIG. 2) from a previous trip or pre-loaded on the device. Additionally or alternatively, the Stored data may be located on a remote server and sent and/or received via a network (e.g., the network 56 of FIG. 4). The remote server may be a dedicated external server 52 or a third party database 54.

In some embodiments, the Stored data may be outdated or incorrect. In such embodiments, the older Stored data may be overwritten by the newer Live data generated by the sonar system 30. In some embodiments, only incorrect or different data in the Stored data may be overwritten. Additionally or alternatively, the Stored data may represent low resolution data and the Live data may be a higher resolution. In such embodiments, the resolution may be determined by the detail or amount of data for a given area. Updating Stored data in such embodiments may include adding additional vertices to a stored 3D mesh data. The low resolution Stored data may be default data covering a large area of water which may not have been previously travelled by the sonar system. In some embodiments the low resolution Stored data may be previously stored data of the sonar system that was compressed or reduced for memory or network transmission constraints. In such an embodiment, the updated Stored data may be stored in a higher resolution and either kept in higher resolution (e.g., areas actually travelled by the sonar system are higher resolution than areas not travelled) or may be later reduced or compressed after a predetermined amount of time, data, or during transmission to a remote server.

In some embodiments the Live data may update the Stored data as simultaneously as it is generated (e.g., immediately). In some other embodiments, the Live data may be cached or temporarily stored before updating the Stored data in bulk (e.g., to conserve processing power or transmission bandwidth). In embodiments where the Stored data is stored remotely, the sonar system may wait for a wireless signal or network connection before uploading the Live data (e.g., the sonar system may be connected via wireless internet at the end of a journey). The updating may be user selectable, such that a user may prompt the Live data to update the Stored data, or may prompt the cache to be stored as the Stored data.

In some embodiments, a first Stored data may be kept locally and a second Stored data may be kept remotely. The first and second Stored data may be simultaneously updated by the Live data. In some alternative embodiments, one of the first and second Stored data may record a low resolution version of the Live data and the other may store a high resolution version. In yet some other embodiments, the first Stored data may be updated as the Live data is generated and the second Stored data may be updated incrementally, either when a network connection is established or when a user prompts the upload.

In some embodiments, the sonar system (e.g., the sonar system 30 of FIG. 2) may receive newer Stored data to update the data stored on the device. The newer Stored data may be received via the network 56 or via direct communications with another sonar system or an intermediate station. In some embodiments, the newer Stored data may be low resolution data, which may be further updated by Live data as the boat travels. In some embodiments, the user may prompt the sonar system (e.g., via the user interface 42) to download a set of Stored data from the network, or alternatively, the sonar system may automatically retrieve Stored data based on a direction of travel, GPS route, general area, or any other desired factor.

Display and Imaging

In any of the embodiments detailed above, a display (e.g., the display 40 of the sonar system 30 shown in FIG. 2) may present one or more sets of data. Combinations of any of the above-referenced sets of data, in addition to chart information, radar, weather, or any other type of information relevant to watercraft, may be presented simultaneously on the display (e.g., via split screen). FIGS. 27-28 demonstrate example embodiments of such split screen combinations. A user may select any of the possible combinations of display, or a sonar system may update the display based on a desired mode or the characteristics of the boat's motion. For example, the sonar system may automatically add a split-screen view of a downscan sonar image when a boat is idling or an engine is shut off (e.g., when trolling).

In some further embodiments, various sets of data, referred to above, may be superimposed or overlaid onto one another. For example, the 3D image may be applied to a chart information (e.g., a map or navigational chart). Additionally or alternatively, depth information, weather information, radar information, or any other sonar system inputs may be applied to one another. For example, weather or radar information may be added above the boat in the perspective view of the 3D image.

Example System Hardware

In some embodiments, referring back to FIGS. 2-4, the transducer assembly (e.g., the transducer assembly 75 shown in FIG. 6) may include a housing (e.g., the housing 58 shown in FIG. 6) that may include mounting holes through which screws, rivets, bolts or other mounting devices may be passed in order to fix the housing 58 to a mounting bracket, a device attached to a vessel or to the hull of the vessel itself. However, in some cases, the housing may be affixed by welding, adhesive, snap fit or other coupling means. The housing may be mounted to a portion of the vessel, or to a device attached to the vessel, that provides a relatively unobstructed view of both sides of the vessel. Thus, for example, the housing (e.g., the housing 58 shown in FIG. 6) may be mounted on or near the keel (or centerline) of the vessel, on a fixed or adjustable mounting bracket that extends below a depth of the keel (or centerline) of the vessel, or on a mounting device that is offset from the bow or stern of the vessel (e.g., towfish, trolling motor, etc.). In some embodiments, the sonar module (e.g., the sonar module 44 of FIG. 2) may have one or more components, such as the sonar signal processor 32, positioned within the housing.

In some embodiments, the transducer array (e.g., transducer arrays 46, 48 shown in FIG. 6) may include multiple transducer elements (e.g., transducer elements 60, 62 shown in FIG. 6). With reference to FIG. 6, the housing 58 may include a recessed portion defining containment volume 66 for holding the transducer components. The recessed portion defining the containment volume may extend away from the hull of the vessel on which the housing 58 is mounted and therefore protrude into the water on which the vessel operates (or in which the vessel operates in a case where the transducer assembly is mounted to a tow fish or other submersible device). To prevent cavitation or the production of bubbles due to uneven flow over the housing 58, the housing 58 (and in particular the containment volume portion of the housing) may have a gradual, rounded or otherwise streamlined profile to permit laminar flow of water over the housing 58. In some examples, an insulated cable may provide a conduit for wiring (e.g., transmitter circuitry 71 or receiver circuitry 72) to couple each of the transducer elements 50, 60, 62 to the sonar module 44. As detailed herein, any of a number of configurations of transducer elements and transducer arrays may be provided within the housing 58.

The shape of a transducer element may largely determine the type of beam that is formed when that transducer element transmits a sonar pulse (e.g., a circular transducer element emits a cone-shaped beam, a linear transducer emits a fan-shaped beam, etc.). In some embodiments, a transducer element may comprise one or more transducer elements positioned to form one transducer element. For example, a linear transducer element may comprise two or more rectangular transducer elements aligned with each other so as to be collinear. In some embodiments, three transducer elements aligned in a collinear fashion (e.g., end to end) may define one linear transducer element.

Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements. Indeed, while depicted and described embodiments generally detail a linear transducer element made of piezoelectric material, other shapes and types of material are applicable to embodiments of the present invention.

In some embodiments, each of the transducer elements (e.g., transducer elements 50, 60, 62 shown in FIG. 6) may be a linear transducer element. Thus, for example, each of the transducer elements may be substantially rectangular in shape and made from a piezoelectric material such as a piezoelectric ceramic material, as is well known in the art. As shown in FIG. 6, the sonar arrays 46, 48 may include an absorptive material forming mounting slots that hold the transducer elements 60, 62.

As noted above, any of the transducer elements described herein (e.g., transducer elements 50, 60, 62 shown in FIG. 6) may be configured to transmit and receive sonar pulses (e.g., transmit/receive transducer elements). While the transducer elements may be described herein as transmit/receive transducer elements, in some embodiments, the transducer elements may be configured as receive-only transducer elements, or in other cases, transmit-only transducer elements.

In transducer elements that transmit, during transmission of sonar pulses, the piezoelectric material, being disposed in a rectangular arrangement, provides for an approximation of a linear array having beamwidth characteristics that are a function of the length and width of the rectangular face of the transducer elements and the frequency of operation. In an example embodiment, a transducer element 50, 60, 62 may be configured to operate in accordance with at least two operating frequencies. In this regard, for example, a frequency selection capability may be provided by the sonar module 44 to enable the user to select one of at least two frequencies of operation. In one example, one operating frequency may be set to about 600 kHz and another operating frequency may be set to about 480 kHz. Furthermore, the length of the transducer elements (e.g., transducer elements 50, 60, 62 shown in FIG. 6) may be set to about 204 mm (or approximately 8 inches) while the width is set to about 1.5 mm to thereby produce beam characteristics corresponding to a fan of about 0.8 degrees by about 32 degrees at 600 kHz or about 1.4 degrees by about 56 degrees at 480 kHz. For example, when operating at 455 kHz, the length and width of the transducer elements may be such that the beamwidth of sonar beam produced by the transducer elements in a direction parallel to a longitudinal length (L) of the transducer elements is less than about five percent as large as the beamwidth of the sonar beam in a direction (w) perpendicular to the longitudinal length of the transducer elements. As such, in some embodiments, any length and width for a transducer element may be used. Lengths longer than 8 inches may be appropriate at operating frequencies lower than those indicated above, and lengths shorter than 8 inches may be appropriate at frequencies higher than those indicated above.

It should be noted that although the widths of various beams are shown and described herein, the widths being referred to do not necessarily correspond to actual edges defining limits to where energy is placed in the water. As such, although beam patterns and projections of beam patterns are generally shown herein as having fixed and typically geometrically shaped and sharply defined boundaries, those boundaries merely correspond to the −3 dB (or half power) points for the transmitted beams. In other words, energy measured outside of the boundaries shown is less than half of the energy transmitted, but this sound energy is present nonetheless. Thus, some of the boundaries shown are merely theoretical half power point boundaries.

The transducer elements can convert electrical energy into sound energy (i.e., transmit) and also convert sound energy (e.g., via detected pressure changes) into an electrical signal (i.e., receive), although some transducers may act only as a hydrophone for converting sound energy into an electrical signal without operating as a transmitter, or only operating to convert an electrical signal into sound energy without operating as a receiver. Depending on the desired operation of the transducer assembly, each of the transducer elements may be configured to transmit sonar pulses and/or receive sonar returns as desired. In some embodiments, the transducer assembly 36 may comprise a combination of transducer elements and/or arrays that are configured to transmit sonar pulses and receive sonar returns, transducer elements that are configured to transmit sonar pulses only, and/or transducer elements that are configured to receive sonar returns only.

In an example embodiment, the sonar signal processor 32, the transceiver 34, the storage module 37 and/or the communications module 38 may form a sonar module 44. As such, for example, in some cases, the transducer assembly 36 may simply be placed into communication with the sonar module 44, which may itself be a mobile device that may be placed (but not necessarily mounted in a fixed arrangement) in the vessel to permit easy installation of one or more displays 40, each of which may be remotely located from each other and operable independent of each other. In this regard, for example, the communications module 38 may include one or more corresponding interface ports for placing the network in communication with each display 40 in a plug-n-play manner. As such, for example, the communications module 38 may not only include the hardware needed to enable the displays 40 to be plugged into communication with the network via the communications module, but the communications module 38 may also include or otherwise be in communication with software modules for providing information to enable the sonar module 44 to communicate with one or more different instances of the display 40 that may or may not be the same model or type of display and that may display the same or different information. In other words, the sonar module 44 may store configuration settings defining a predefined set of display types with which the sonar module is compatible so that if any of the predefined set of display types are placed into communication with the sonar module 44, the sonar module 44 may operate in a plug-n-play manner with the corresponding display types. Accordingly, the sonar module 44 may include the storage device 37 storing device drivers accessible to the communications module 38 to enable the sonar module 44 to properly work with displays for which the sonar module 44 is compatible. The sonar module 44 may also be enabled to be upgraded with additional device drivers or transceivers to enable expansion of the numbers and types of devices with which the sonar module 44 may be compatible. In some cases, the user may select a display type to check whether a display type is supported and, if the display type is not supported, contact a network entity to request software and/or drivers for enabling support of the corresponding display type.

The sonar signal processor 32 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 32 as described herein. In this regard, the sonar signal processor 32 may be configured to analyze electrical signals communicated thereto by the transceiver 34 to provide sonar data indicative of the size, location, shape, etc. of objects detected by the sonar system 30. For example, the sonar signal processor 32 may be configured to receive sonar return data and process the sonar return data to generate sonar image data for display to a user (e.g., on display 38). Moreover, in some embodiments, the sonar signal processor 32 may be configured to receive downscan sonar return data and sidescan sonar return data for processing and generation of sonar image data for display to a user.

In some cases, the sonar signal processor 32 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor 32 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with the storage module 37, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 32 may execute commercially available software for controlling the transceiver 34 and/or transducer assembly 36 and for processing data received therefrom.

The transceiver 34 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 34 as described herein. In this regard, for example, the transceiver 34 may include (or be in communication with) circuitry (e.g., transmitter circuitry 71 shown in FIG. 2) for providing one or more transmission electrical signals to the transducer assembly 36 for conversion to sound pressure signals based on the provided electrical signals to be transmitted as a sonar pulse. The transceiver 34 may also include (or be in communication with) circuitry (e.g., receiver circuitry 72 shown in FIG. 2) for receiving one or more electrical signals produced by the transducer assembly 36 responsive to sound pressure signals received at the transducer assembly 36 based on echo or other return signals received in response to the transmission of a sonar pulse. The transceiver 34 may be in communication with the sonar signal processor 32 to both receive instructions regarding the transmission of sonar signals and to provide information on sonar returns to the sonar signal processor 32 for analysis and ultimately for driving one or more of the displays 38 based on the sonar returns. In some embodiments, the transmitter circuitry 71 and/or receiver circuitry 72 may be positioned within the transceiver 34 or sonar module 44. In other embodiments the transmitter circuitry 71 and/or receiver circuitry 72 may be positioned within the transducer assembly 36. Likewise, in some embodiments, the transmitter circuitry 71 and/or receiver circuitry 72 may be positioned separate from the transducer assembly 36 and transceiver 34/sonar module 44.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A sonar system comprising:
   a housing mountable to a watercraft capable of traversing a body of water;
   at least one transducer array positioned within the housing and aimed downwardly from the watercraft,
      wherein the transducer array comprises a transmit/receive transducer element and a second transducer element,
      wherein the transmit/receive transducer element is configured to transmit sonar pulses into the water;
      wherein the transmit/receive transducer element is configured to receive first sonar returns from the sonar pulses produced by the transmit/receive transducer element and convert sound energy of the first sonar returns into first sonar return data,
      wherein the second transducer element is configured to receive second sonar returns from the sonar pulses produced by the transmit/receive transducer element and convert sound energy of the second sonar returns into second sonar return data, and
      wherein the transmit/receive transducer element is positioned within the housing at a predetermined distance from the second transducer element; and
   a sonar signal processor configured to:
      process the first sonar return data and the second sonar return data to generate a set of 2D sonar data, wherein each sonar return of the set of 2D sonar data defines a distance value and an angle, wherein the angle associated with each sonar return is based on the predetermined distance between the transmit/receive transducer element and the second transducer element, wherein the distance value associated with each sonar return corresponds to a distance between a position of the sonar return and the at least one transducer array; and
      generate 3D mesh data based on the set of 2D sonar data, wherein the 3D mesh data is a basis for a 3D image of an underwater environment in a three dimensional coordinate system.

2. The sonar system of claim 1, further comprising a display configured to display the 3D image of the underwater environment.

3. The sonar system of claim 1, wherein the at least one transducer array comprises a downscan transducer array such that the transmit/receive transducer element is configured to transmit sonar pulses in a substantially perpendicular direction to a plane of a surface of the body of water.

4. The sonar system of claim 3, wherein the transmit/receive transducer element comprises a linear downscan transducer element configured to transmit the sonar pulses as a fan-shaped beam in at least a direction perpendicular to a direction of travel of the watercraft.

5. The sonar system of claim 4, wherein the transmit/receive transducer element is configured to transmit the fan-shaped beam substantially symmetrically across a centerline of the watercraft.

6. The sonar system of claim 4, wherein the linear downscan transducer element is formed of a plurality of transducer elements electrically connected to act as the linear downscan transducer element.

7. The sonar system of claim 3, wherein:
   at least one of the transmit/receive transducer element and the second transducer element is further configured to receive downscan sonar returns from the sonar pulses produced by the transmit/receive transducer element and convert sound energy of the downscan sonar returns into downscan sonar return data;

the sonar signal processor is further configured to process the downscan sonar return data to generate downscan image data; and wherein the sonar system further comprises a display configured to display a downscan image of the underwater environment based on the downscan image data.

8. The sonar system of claim 1, wherein the sonar signal processor is further configured to:

generate a plurality of sets of 2D sonar data as the watercraft traverses the body of water; and generate the 3D mesh data based on the plurality of sets of 2D sonar data generated as the watercraft traverses the body of water.

9. The sonar system of claim 1, wherein each sonar return of the set of 2D sonar data further defines a signal return strength value.

10. The sonar system of claim 1, wherein the sonar signal processor is further configured to process the first sonar return data and the second sonar return data to generate 2D sonar data by calculating a phase difference between the first sonar return data and the second sonar return data.

11. The sonar system of claim 1, wherein the predetermined distance between the transmit/receive transducer element and the second transducer element defines a first predetermined distance, wherein the transducer array further comprises a third transducer element, wherein the third transducer element is configured to receive third sonar returns from the sonar pulses produced by the transmit/receive transducer element and convert sound energy of the third sonar returns into third sonar return data, wherein the third transducer element is positioned a second predetermined distance from the second transducer element, and wherein the sonar signal processor is further configured to process the first sonar return data, the second sonar return data, and the third sonar return data to generate the 3D mesh data based on at least the first predetermined distance and the second predetermined distance.

12. The sonar system of claim 1, wherein the transducer array is a downscan transducer array, wherein the sonar system further comprises:

at least one sidescan transducer array positioned within the housing and aimed downwardly and outwardly from a side of the watercraft, wherein the sidescan transducer array comprises a first sidescan transducer element and a second sidescan transducer element, wherein the first sidescan transducer element is configured to receive fourth sonar returns from the sonar pulses produced by the transmit/receive transducer element and convert sound energy of the fourth sonar returns into fourth sonar return data, wherein the second sidescan transducer element is configured to receive fifth sonar returns from the sonar pulses produced by the transmit/receive transducer element and convert sound energy of the fifth sonar returns into fifth sonar return data, and wherein the first sidescan transducer element is positioned within the housing at a predetermined distance from the second sidescan transducer element; and the sonar signal processor is further configured to process the fourth sonar return data and the fifth sonar return data to generate the 3D mesh data based on at least the predetermined distance between the first sidescan transducer element and the second sidescan transducer element.

13. The sonar system of claim 1, wherein the predetermined distance is designed based on a frequency of operation of the transmit/receive transducer element and the second transducer element.

14. The sonar system of claim 1, wherein the transducer array defines an emitting surface that corresponds to an emitting surface of the transmit/receive transducer element and an emitting surface of the second transducer element, wherein the emitting surface is straight such that the emitting surface of the transmit/receive transducer element and the emitting surface of the second transducer element are configured to define a same angle with respect to a surface of the body of water.

15. The sonar system of claim 1, wherein the transducer array defines an emitting surface that corresponds to an emitting surface of the transmit/receive transducer element and an emitting surface of the second transducer element, wherein the emitting surface is curved such that the emitting surface of the transmit/receive transducer element and the emitting surface of the second transducer element are configured to define different angles with respect to a surface of the body of water.

16. The sonar system of claim 1 further comprising shielding positioned in the housing and configured to surround at least a portion of the transducer array.

17. The sonar system of claim 16, wherein the shielding comprises absorption material that defines at least two mounting slots, wherein a first mounting slot is configured to surround three sides and two ends of the transmit/receive transducer element, wherein the second mounting slot is configured to surround three sides and two ends of the second transducer element.

18. The sonar system of claim 1, wherein the transmit/receive transducer element is configured to emit a fan-shaped sonar beam having a relatively narrow beamwidth in a direction parallel to a fore-to-aft direction of the watercraft and a relatively wide beamwidth in a direction perpendicular to the fore-to-aft direction of the watercraft.

19. The sonar system of claim 1, wherein the transmit/receive transducer element is formed of a plurality of transducer elements electrically connected to act as the transmit/receive transducer element.

20. The sonar system of claim 1, further comprising a display configured to display the 3D image of the underwater environment based on the 3D mesh data and chart information in a split screen format.

21. A transducer assembly comprising:

a housing mountable to a watercraft capable of traversing a body of water; and at least one transducer array positioned within the housing and aimed downwardly from the watercraft, wherein the transducer array comprises a transmit/receive transducer element and a second transducer element, wherein at least one of the transmit/receive transducer element and the second transducer element is a transmit/receive transducer element configured to transmit sonar pulses into the water;

wherein the transmit/receive transducer element is configured to receive first sonar returns from the sonar pulses produced by the transmit/receive transducer element and convert sound energy of the first sonar returns into first sonar return data, wherein the second transducer element is configured to receive second sonar returns from the sonar pulses produced by the transmit/receive transducer element and convert sound energy of the second sonar returns into second sonar return data, and wherein the transmit/receive transducer element is positioned within the housing at a predetermined distance from the second transducer element;

wherein first sonar return data and the second sonar return data are further configured to define a set of 2D sonar data, wherein each sonar return of the set of 2D sonar data defines a distance value and an angle, wherein the angle associated with each sonar return is based on the predetermined distance between the transmit/receive transducer element and the second transducer element, wherein the distance value associated with each sonar return corresponds to a distance between a position of the sonar return and the at least one transducer array; and wherein the transmit/receive transducer element and the second transducer element are configured to transmit the first sonar return data and the second sonar return data, respectively, to a sonar signal processor to be processed by the sonar signal processor to generate the set of 2D sonar data and 3D mesh data based on the set of 2D sonar data, wherein the 3D mesh data is a basis for a 3D image of an underwater environment in a three dimensional coordinate system.

22. The transducer assembly of claim 21, wherein the at least one transducer array comprises a downscan transducer array such that the transmit/receive transducer element is configured to transmit sonar pulses in a substantially perpendicular direction to a plane of a surface of the body of water.

23. The transducer assembly of claim 22, wherein the transmit/receive transducer element comprises a linear downscan transducer element configured to transmit the sonar pulses as a fan-shaped beam in at least a direction perpendicular to a direction of travel of the watercraft.

24. The transducer assembly of claim 23, wherein the transmit/receive transducer element is configured to transmit the fan-shaped beam substantially symmetrically across a centerline of the watercraft.

25. The transducer assembly of claim 23, wherein the linear downscan transducer element is formed of a plurality of transducer elements electrically connected to act as the linear downscan transducer element.

26. The transducer assembly of claim 22, wherein:
at least one of the transmit/receive transducer element and the second transducer element is further configured to receive downscan sonar returns from the sonar pulses produced by the transmit/receive transducer element and convert sound energy of the downscan sonar returns into downscan sonar return data;
the sonar signal processor is further configured to process the downscan sonar return data to generate downscan image data; and
wherein the transducer assembly further comprises a display configured to display a downscan image of the underwater environment based on the downscan image data.

27. The transducer assembly of claim 21, wherein the first sonar return data and the second sonar return data are configured to be processed to generate a plurality of sets of 2D sonar data as the watercraft traverses the body of water; and to generate the 3D mesh data based on the plurality of sets of 2D sonar data generated as the watercraft traverses the body of water.

28. The transducer assembly of claim 21, wherein the first sonar return data and the second sonar return data are further configured to be processed to generate 2D sonar data by calculating a phase difference between the first sonar return data and the second sonar return data.

29. The transducer assembly of claim 21, wherein the predetermined distance between the transmit/receive transducer element and the second transducer element defines a first predetermined distance, wherein the transducer array further comprises a third transducer element, wherein the third transducer element is configured to receive third sonar returns from the sonar pulses produced by the transmit/receive transducer element and convert sound energy of the third sonar returns into third sonar return data, wherein the third transducer element is positioned a second predetermined distance from the second transducer element, and wherein the first, second, and third transducer elements are configured to transmit the first sonar return data, the second sonar return data, and the third sonar return data to the sonar signal processor to generate the 3D mesh data based on at least the first predetermined distance and the second predetermined distance.

30. The transducer assembly of claim 21, wherein the transducer array defines an emitting surface that corresponds to an emitting surface of the transmit/receive transducer element and an emitting surface of the second transducer element, wherein the emitting surface is straight such that the emitting surface of the transmit/receive transducer element and the emitting surface of the second transducer element are configured to define a same angle with respect to a surface of the body of water.

31. The transducer assembly of claim 21, wherein the transducer array defines an emitting surface that corresponds to an emitting surface of the transmit/receive transducer element and an emitting surface of the second transducer element, wherein the emitting surface is curved such that the emitting surface of the transmit/receive transducer element and the emitting surface of the second transducer element are configured to define different angles with respect to a surface of the body of water.

32. The transducer assembly of claim 21, wherein the transmit/receive transducer element is formed of a plurality of transducer elements electrically connected to act as the transmit/receive transducer element.

33. A method for imaging an underwater environment comprising:
transmitting sonar pulses into a body of water using a transmit/receive transducer element comprising at least one of a transmit/receive transducer element and a second transducer element of a transducer array positioned within a housing mountable to a watercraft capable of traversing the body of water;
receiving, via the transmit/receive transducer element of the transducer array, first sonar returns from the sonar pulses produced by the transmit/receive transducer element,
wherein the transducer array is positioned within the housing and aimed downwardly from the watercraft, and wherein the transmit/receive transducer element is configured to convert sound energy of the first sonar returns into first sonar return data;
receiving, via the second transducer element of the transducer array, second sonar returns from the sonar pulses produced by the transmit/receive transducer element, wherein the second transducer element is configured to convert sound energy of the second sonar returns into second sonar return data, and wherein the transmit/receive transducer element is positioned within the housing at a predetermined distance from the second transducer element; and processing, via a sonar signal processor, the first sonar return data and the second sonar return data to generate a set of 2D sonar data, wherein each sonar return of the set of 2D sonar data defines a distance value and an angle, wherein the angle associated with each sonar return is based on the predetermined distance between the transmit/receive transducer element and the second transducer element, wherein the distance value associated with each sonar return corresponds to a distance between a position of the sonar return and the at least one transducer array; and generating 3D mesh data based on the set of 2D sonar data, wherein the 3D mesh data is a basis for a 3D image of an underwater environment in a three dimensional coordinate system.

34. The method of claim 33, further comprising displaying, via a display, the 3D image of the underwater environment.

35. The method of claim 33, wherein the at least one transducer array comprises a downscan transducer array such that the transmit/receive transducer element is configured to transmit sonar pulses in a substantially perpendicular direction to a plane of a surface of the body of water.

36. The method of claim 35, wherein the transmit/receive transducer element comprises a linear downscan transducer element configured to transmit the sonar pulses as a fan-shaped beam in at least a direction perpendicular to a direction of travel of the watercraft.

37. The method of claim 33, further comprising generating a plurality of sets of 2D sonar data as the watercraft traverses the body of water; and generating the 3D mesh data based on the plurality of sets of 2D sonar data generated as the watercraft traverses the body of water.

38. The method of claim 33, further comprising processing the first sonar return data and the second sonar return data to generate 2D sonar data by calculating a phase difference between the first sonar return data and the second sonar return data.

* * * * *